(12) United States Patent
Wang et al.

(10) Patent No.: US 9,966,875 B2
(45) Date of Patent: May 8, 2018

(54) FIVE-LEVEL TOPOLOGY UNITS AND INVERTER THEREOF

(71) Applicants: Hongliang Wang, Kingston (CA); Yanfei Liu, Kingston (CA)

(72) Inventors: Hongliang Wang, Kingston (CA); Yanfei Liu, Kingston (CA)

(73) Assignees: Hongliang Wang, Kingston, Ontario (CA); Yan-Fei Liu, Kingston, Ontario (CA)

( * ) Notice: Subject to any disclaimer, the term of this patent is extended or adjusted under 35 U.S.C. 154(b) by 269 days.

(21) Appl. No.: 14/690,761

(22) Filed: Apr. 20, 2015

(65) Prior Publication Data
US 2015/0333522 A1    Nov. 19, 2015

Related U.S. Application Data

(60) Provisional application No. 62/109,413, filed on Jan. 29, 2015.

(51) Int. Cl.
| | | |
|---|---|---|
| *H02M 7/483* | (2007.01) | |
| *H02M 7/487* | (2007.01) | |
| *H02M 7/537* | (2006.01) | |
| *H02M 7/217* | (2006.01) | |
| *H02M 7/219* | (2006.01) | |

(52) U.S. Cl.
CPC ........... *H02M 7/537* (2013.01); *H02M 7/483* (2013.01); *H02M 7/217* (2013.01); *H02M 7/219* (2013.01); *H02M 7/487* (2013.01); *Y10T 307/50* (2015.04)

(58) Field of Classification Search
CPC .......... H02M 7/04; H02M 7/12; H02M 7/217; H02M 7/219; H02M 7/42; H02M 7/44; H02M 7/48; H02M 7/483; H02M 7/487; H02M 7/537; H02M 7/5387;
(Continued)

(56) References Cited

U.S. PATENT DOCUMENTS

| | | | | |
|---|---|---|---|---|
| 4,184,197 A | * | 1/1980 | Cuk ..................... | H02M 3/005 363/16 |
| 6,392,907 B1 | * | 5/2002 | Ichikawa ............. | H02M 7/487 363/132 |

(Continued)

FOREIGN PATENT DOCUMENTS

| | | | | |
|---|---|---|---|---|
| CN | 104218832 A | * | 12/2014 | ............ H02M 7/483 |
| EP | 2251969 A1 | | 11/2010 | |

OTHER PUBLICATIONS

X. Yuan, "A new five-level converter for low-voltage motor drive applications," 2014 17th International Conference on Electrical Machines and Systems (ICEMS), Hangzhou, 2014, pp. 2969-2974.*

(Continued)

*Primary Examiner* — Timothy J Dole
*Assistant Examiner* — Ivan Laboy Andino

(57) ABSTRACT

Five-level topology units and inverters based on the five-level inverter units without a boost circuit. Cost is reduced by using only one AC filtering inductor and high efficiency is achieved in the absence of an extra boosting circuit. Leakage current is eliminated substantially by using a half-bridge inverter module. A five-level inverter including a five-level topology unit without a boost circuit to raise the input voltage is able to output the same AC power as a five-level full bridge inverter under the same working condition.

25 Claims, 16 Drawing Sheets

(58) Field of Classification Search
CPC ...... H02M 7/5388; H02M 7/797; H02J 3/383;
H02J 7/0068; Y10T 307/50
USPC ....... 363/16–17, 34–43, 84, 89, 95–98, 101,
363/125, 127, 131–132, 135–136
See application file for complete search history.

(56) References Cited

U.S. PATENT DOCUMENTS

2013/0301314 A1* 11/2013 Fu .................. H02M 7/487
363/37
2016/0043659 A1* 2/2016 Xu .................. H02M 7/487
363/131

OTHER PUBLICATIONS

J. Korhonen, A. Sankala, J. P. Ström, P. Silventoinen and A. Doktar, "Five-level inverter with a neutral point connection and a flying capacitor," 2014 16th European Conference on Power Electronics and Applications, Lappeenranta, 2014, pp. 1-7.*
English Abstract for CN104218832A obtained from espacenet.com on Aug. 20, 2017.*

U.S. Appl. No. 14/217,013, filed Mar. 17, 2014, FutureWei Tech.
U.S. Appl. No. 14/199,749, filed Mar. 6, 2014, FutureWei Tech.
F. Gao, P. Loh, F. Blaabjerg, D. Viiathgamuwa. "Five-Level Current-Source Inverters With Buck-Boost and Inductive-Current Balancing Capabilities". IEEE Transactions on Industry Electronics, vol. 50, No. 8, pp. 2613-2622. 2010.
R. Cacau, R. Bascope, J. Neto and G. Bascope, "Five-level T-Type Inverter Based on Multistate Switching Cell". IEEE Transactions on Industry Applications, vol. 50, No. 6, pp. 3857-3866, 2014.
K. Wang, Z. Zheng, Y. Li , K. Liu and J. Shang. "Neutral-Point Potential Balancing of a Five-Level Active Neutral-Point-Clamped Inverter". IEEE Transactions on Industry Electronics, vol. 60, No. 5, pp. 1907-1918, 2013.
M. Renge, H. Suryawanshi. "Five-Level Diode Clamped Inverter to Eliminate Common Mode Voltage and Reduce dv/dt inMedium Voltage Rating Induction Motor Drives". IEEE Transactions on Power Electronics, vol. 23, No. 4, pp. 1598-1607, 2008.
S. Pulikanti, V. Agelidis "Hybrid Flying-Capacitor-Based Active-Neutral-Point-ClampedFive-Level Converter Operated With SHE-PWM". IEEE Transactions on Industry Electronics, vol. 58, No. 10, pp. 4643-4653, 2011.
R. Soairo, J. Kolar. "The new high efficiency hybrid neutral-point-clamped converter", IEEE Transactions on Industry Electronics, vol. 60, No. 5, pp. 1919-1935, 2013.

* cited by examiner

FIVE-LEVEL TOPOLOGY UNITS AND INVERTER THEREOF

RELATED APPLICATION

This application claims the benefit of the filing date of U.S. Provisional Application No. 62/109,413, filed on Jan. 29, 2015, the content of which is hereby incorporated by reference in its entirety.

FIELD OF THE INVENTION

The invention relates to five-level topology units and inverter circuits, especially for the renewable energy system.

BACKGROUND

With the increasing threat of global energy and serious environmental problem, the renewable energy has been developing fast. Photovoltaic industry has an extensive future as its resources are plentiful and widespread. It is an important issue to lower cost and improve efficiency for photovoltaic system.

Inverter is used to convert DC from photovoltaic arrays into AC in photovoltaic system. There are two kinds of grid-connected inverters. They are isolated and non-isolated ones. The transformer is used in the former to keep human electrically safe. But because of its power loss and huge volume, it results in many problems, such as low efficiency and power density, and high cost. Therefore, the non-isolated inverter in photovoltaic system is popular. However, there is a common mode loop circuit for the absence of transformer in the non-isolated inverter system. The high frequency and common mode current in the loop circuit leads to electromagnetic interference, and at the same time, it is dangerous to devices and human. So the high frequency and common mode current becomes a critical issue to be solved for the non-isolated inverter system.

There are two kinds of non-isolated inverters in photovoltaic system.

The first kind of inverter is symmetry in topology and it has double AC filtering inductors. Full bridge inverter circuit is usually of this kind. No extra circuit in the full bridge is needed to boost input voltage in many cases since it is enough for half of that of the half-bridge. But it is difficult for the full bridge inverter to cancel substantially the high frequency leakage current because of the parasitic factors within the inverter system. The improvements of conventional H4 full bridge circuit are made to reduce the high frequency leakage current so that it meets the industry standard. However, it costs much because the two AC filtering inductors' magnetic cores are not common for the symmetry mode.

The second kind of inverter is non-symmetry and it has single AC filtering inductor. Half bridge and mid-point clamped inverter circuits are examples of this kind. The terminal of utility grid is connected with the mid-point of DC input voltage. The parasitic capacitor voltage is constant so that the leakage current is eliminated substantially. However, it needs an extra circuit to boost input voltage as it is twice of that of the first kind. The extra circuit lowers efficiency.

So it can be seen that if the second kind of inverter can work normally without the extra boosting circuit, it has obvious advantages over the first kind in low cost and high efficiency.

For the sake of brevity, the term "full bridge inverter" as used herein is intended to refer to the said first kind of inverter and the term "half bridge inverter" is intended to represent the said second kind.

In addition, five-level inverter is becoming popular to improve efficiency.

SUMMARY

Provided herein are a five-level topology unit and inverter thereof to solve the above problems. They are non-isolated. To make sure the current flows in both directions, each semiconductor switch is connected in reverse parallel with a diode. For the sake of brevity, the term "bidirectional switch" as used herein is intended to refer to a semiconductor switch connected in reverse parallel with a diode.

The five-level topology unit is used with a first DC power supply and a second DC power supply. The negative terminal of the first DC power supply is connected in series with the positive terminal of the second DC power supply. The five-level topology unit comprises: a floating capacitor that is charged by the first DC power supply or the second DC power supply; and a half-bridge inverter module that outputs five mutually different voltage levels including zero; wherein either the first DC power supply or the second DC power supply provides power for the half-bridge inverter module; or either the first DC power supply or the second DC power supply added algebraically to the floating capacitor provides power for the half-bridge inverter module.

Also provided herein is a five-level topology unit comprising: a first DC power supply and a second DC power supply whose positive terminal is connected in series with the negative terminal of the first DC power supply; a floating capacitor that is charged by the first DC power supply or the second DC power supply; and a half-bridge inverter module that outputs five mutually different voltage levels including zero; wherein either the first DC power supply or the second DC power supply provides power for the half-bridge inverter module; or either the first DC power supply or the second DC power supply added algebraically to the floating capacitor provides power for the half-bridge inverter module.

In some embodiments, the five-level topology unit further comprises a first switching circuit branch and a second switching circuit branch; wherein the first terminal of the first switching circuit branch is connected with the positive terminal of the first DC power supply; the second terminal of the first switching circuit branch is connected with the negative terminal of the floating capacitor; the first terminal of the second switching circuit branch is connected with the positive terminal of the floating capacitor; the second terminal of the second switching circuit branch is connected with the negative terminal of the second DC power supply.

In some embodiments, the first switching circuit branch comprises a first bidirectional switch and the second switching circuit branch comprises a second bidirectional switch; wherein the first terminal of the first bidirectional switch is connected with the first terminal of the first switching circuit branch; the second terminal of the first bidirectional switch is connected with the second terminal of the first switching circuit branch; the first terminal of the second bidirectional switch is connected with the first terminal of the second switching circuit branch; the second terminal of the second bidirectional switch is connected with the second terminal of the second switching circuit branch.

In some embodiments, the five-level topology unit further comprises a circuit module that charges the floating capacitor; wherein the circuit module comprises a first terminal, a second terminal, a third terminal, a first subordinate switching circuit branch and a second subordinate switching circuit branch; the first terminal is connected with the common terminal of the first DC power supply and the second DC power supply; the second terminal is connected with the positive terminal of the floating capacitor; the third terminal is connected with the negative terminal of the floating capacitor; two terminals of the first subordinate switching circuit branch are connected respectively with the first terminal and the second terminal of the circuit module; the second subordinate switching circuit branch is located between the first terminal and the third terminal of the circuit module.

In some embodiments, the circuit module further comprises a first inductor that connects the first terminal of the circuit module to the common terminal of the first subordinate switching circuit branch and the second subordinate switching circuit branch; and the half-bridge inverter module is connected with AC utility through a second inductor; wherein the first inductor shares a magnetic core with the second inductor.

In some embodiments, the half-bridge inverter module comprises a first subordinate module and a second subordinate module; wherein the first subordinate module comprises a first input terminal, a second input terminal, a common output terminal to the second subordinate module, a first switching circuit sub-branch and a second switching circuit sub-branch; the second subordinate module comprises a third input terminal, a fourth input terminal, the common output terminal (that is also the output terminal of the half-bridge inverter module), a third switching circuit sub-branch and a fourth switching circuit sub-branch; the first input terminal is connected with the positive terminal of the first DC power supply; the second input terminal is connected with the positive terminal of the floating capacitor; the third input terminal is connected with the negative terminal of the floating capacitor; the fourth input terminal is connected with the negative terminal of the second DC power supply; there is the first switching circuit sub-branch between the first input terminal and the output terminal; there is the second switching circuit sub-branch between the second input terminal and the output terminal; there is the third switching circuit sub-branch between the third input terminal and the output terminal; there is the fourth switching circuit sub-branch between the fourth input terminal and the output terminal; the output terminal is used as an alternating current terminal.

Provided herein is a single phase five-level inverter.

The said single phase five-level inverter comprises at least a controller and the said five-level topology unit. The controller provides a control signal for each bidirectional switch in the five-level topology unit so that each one is driven by its own control signal.

In some embodiments, one terminal of AC utility is connected with the common terminal of the first DC power supply and the second DC power supply while the other terminal of AC utility is connected with the half-bridge inverter module.

Also provided herein is a three-phase five-level Inverter.

The said three-phase five-level inverter comprises at least a controller and three of the said five-level topology units. The said three five-level topology units share the said first DC power supply and second DC power supply. All the first input terminals of the first subordinate modules in the three five-level topology units are connected with the positive terminal of the first DC power supply; all the first terminals of the circuit modules in the three five-level topology units are connected with the common terminal of the first DC power supply and the second DC power supply; all the fourth input terminals of the second subordinate modules in the three five-level topology units are connected with the negative terminal of the second DC power supply; all the output terminals of the half-bridge inverter modules in the three five-level topology units are connected respectively with the three phase terminals of AC utility. The controller provides a control signal for each bidirectional switch in the three five-level topology units so that it is driven by its own control signal.

In some embodiments, all the circuit modules in the three five-level topology units of the three-phase five-level inverter share the first inductor.

In some embodiments, the common terminal of the first DC power supply and the second DC power supply of the three-phase five-level inverter is connected with the neutral terminal of AC utility.

Consequently, provided in the invention are five-level topology units and inverter thereof without an extra boosting circuit wherein the cost is reduced by using only one AC filtering inductor and high efficiency is achieved for the absence of the extra boosting circuit and, furthermore, wherein the leakage current is eliminated substantially by using the half-bridge inverter module. The five-level inverter including the said five-level topology unit without an extra circuit to raise input voltage (i.e. Boost circuit) is able to output the same AC power as the said five-level full bridge inverter under the same working condition.

In addition, the time for both charging and discharging the floating capacitor is equal to the switching period of the semiconductor switch in the five-level topology units. It is usually fifty microseconds in practical situation. It is so short that the said floating capacitor with small capacity is able to meet the requirement.

The five-level topology units and inverter thereof provided in the invention can be used for, but not limited to, renewable energy power system, such as single-phase or three-phase grid-connected photovoltaic system.

BRIEF DESCRIPTION OF THE DRAWINGS

For a more complete understanding of the present invention, reference is now made to the following description taken in conjunction with accompanying drawings, in which.

DETAILED DESCRIPTION OF THE EMBODIMENTS

Provided herein are five-level topology units and inverter thereof. For a better understanding of the invention, and to show more clearly how it may be carried into effect, embodiments will be described in detail with reference of the accompanying drawings. Of course, the embodiments described below are part of the invention examples, not all of them. Those skilled in the art will recognize or be able to ascertain variants of the embodiments described herein. Such variants are within the scope of the invention and are covered by the appended claims.

Figure 1:
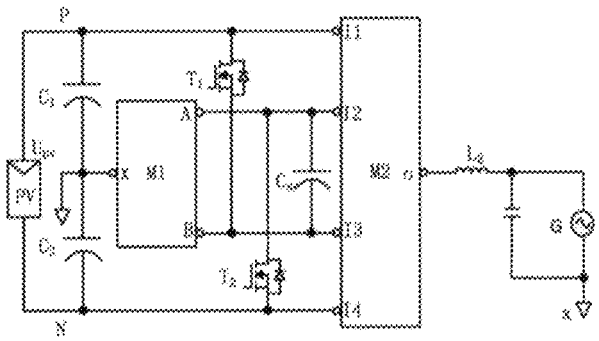
FIG. 1 is a circuit diagram in partial block form of a five-level inverter according to an embodiment of the invention.

As shown in FIG. 1, the term "PV" as used herein is intended to refer to photovoltaic arrays (i.e. DC power supply), $U_{PV}$ is its DC output voltage, M1 is the said circuit module in the five-level topology unit, M2 is the said half-bridge inverter module, $C_1$ is a first capacitor (i.e. the first DC power supply), $C_2$ is a second capacitor (i.e. the second DC power supply) and $C_s$ is the floating capacitor. The said first switching circuit branch comprises a bidirectional switch $T_1$ and the said second switching circuit branch comprises a bidirectional switch $T_2$.

Of course, the PV is able to be replaced by the other DC power supply. That is to say, the DC power supply is not limited to PV in the invention.

Notice that diodes are used for the elements characterized by single directional conduction in the invention, but not limited to diodes. The positive terminal of diode is referred to Anode and the negative terminal is Cathode.

The kind of switch MOSFET is used for the said semiconductor switch in the invention. Take the N-channel MOSFET for example. The first terminal of N-channel MOSFET is referred to Drain, the second terminal is Source and the control terminal is Gate. The control terminal of each semiconductor switch in the said five-level topology unit is provided with its own control signal. For the sake of brevity, it is not described repeatedly below.

To make sure the current in the branch of each semiconductor switch located flows in both directions, each semiconductor switch in the invention is reversely parallel connected with a diode. For the sake of brevity, the term "bidirectional switch" as used herein is intended to refer to a semiconductor switch connected in reverse parallel with a diode.

The said semiconductor switch can also be implemented by the other kind of transistor, for example, the NPN type transistor. For the NPN type transistor, the first terminal is referred to Collector terminal, the second terminal is Emitter and the control terminal is Base. Of course, the semiconductor switch is not limited to MOSFET or the NPN type transistor. That is to say, the other triode with characteristics of alternative states (on and off) is able to be used as the said semiconductor switch in the invention.

The negative terminal of the said first capacitor $C_1$ is connected with the positive of the said second $C_2$, and the positive of the said first capacitor $C_1$ is connected with the positive of the said PV. The negative terminal of the said second capacitor $C_2$ is connected with the negative of the said PV.

The said circuit module M1 at least comprises a first terminal X, a second terminal A, a third terminal B, a first subordinate switching circuit branch and a second subordinate switching circuit branch. The two terminals of the first subordinate switching circuit branch are connected respectively with the said first terminal X and the said second terminal A. The second subordinate switching circuit branch is located between the said first terminal X and the said third terminal B. The said first terminal X is connected with the common terminal of the said first capacitor $C_1$ and the said second $C_2$. The said second terminal A is connected with the positive terminal of the said floating capacitor $C_s$ and the said third terminal B is connected with the negative terminal of the said floating capacitor $C_s$.

The said half-bridge inverter module M2 at least comprises a first input terminal I1, a second input terminal I2, a third input terminal I3, a fourth input terminal I4, an output terminal O and four switching circuit sub-branches. There is a switching circuit sub-branch between each of the said input terminals and the said output terminal O. The said output terminal O is connected with the AC utility.

Figure 2:
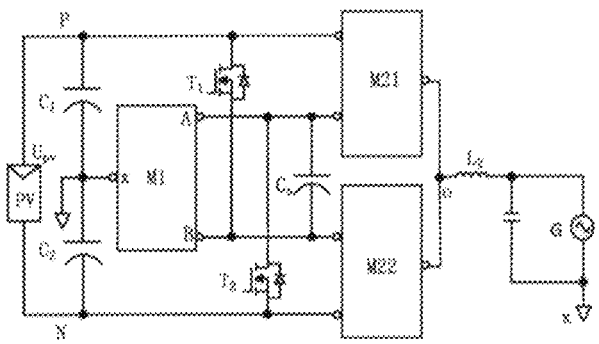
FIG. 2 is another circuit diagram in partial block form of a five-level inverter according to an embodiment of the invention.

As shown in FIG. 2, the said half-bridge inverter module M2 is divided into two subordinate modules. They are the first subordinate module M21 and the second subordinate module M22. The first subordinate module M21 comprises the first input terminal I1, the second input terminal I2, the output terminal O, the said first switching circuit sub-branch and the said second one. The second subordinate module M22 comprises the third input terminal I3, the fourth input terminal I4, the output terminal O, the said third switching circuit sub-branch and the said fourth one.

The first terminal of the said bidirectional switch T1 is connected with both the said first input terminal I1 of the said half-bridge inverter module M2 and the positive terminal of the said first capacitor $C_1$. The second terminal of the said bidirectional switch T1 is connected with the said third input terminal I3. The first terminal of the said bidirectional switch T2 is connected with the said second input terminal I2 and its second terminal is connected with both the said fourth input terminal I4 and the negative terminal of the said second capacitor $C_2$.

The positive terminal of the said floating capacitor $C_s$ is connected with the said second input terminal I2 of the said half-bridge inverter module M2, and its negative terminal is connected with the said third input terminal I3. The said floating capacitor $C_s$ is mainly used to increase input voltage of inverter.

The said circuit module M1 is mainly used to charge the said floating capacitor $C_s$ by alternative loop circuits. The first loop circuit comprises the said first capacitor $C_1$, the circuit branch formed by I1 and I2, the said floating capacitor $C_s$ and the said second subordinate switching circuit branch in said circuit module M1. The second loop circuit comprises the said second capacitor $C_2$, the said first subordinate switching circuit branch, the said floating capacitor $C_s$, and the circuit branch formed by I3 and I4. The floating capacitor $C_s$ is discharged when it acts as part of the DC power supply of inverter.

The sum time for both charging and discharging the floating capacitor $C_s$ is equal to the switching period of the semiconductor switch in the inverter. It is usually 50 microseconds in practical situation. It is so short that the floating capacitor $C_s$ voltage change caused by charging and discharging it can be completely neglected. So the said floating capacitor with small capacity is able to meet the requirement.

The period of the said capacitor $C_1$ or $C_2$ charged and discharged is the same with that of industrial power if the input power is drawn from utility. So there is in need of the said capacitor $C_1$ or $C_2$ with large capacity. In practical situation, the capacity of the said capacitor $C_1$ or $C_2$ is usually hundreds of times of that of the floating capacitor $C_s$.

It is easy to find that the said floating capacitor $C_s$ voltage equals the said first capacitor $C_1$ voltage or the said second capacitor $C_2$ voltage by controlling either of the on and off states of each semiconductor switch in the said five-level topology unit.

Suppose the capacity of the first capacitor $C_1$ is equal to that of the second $C_2$ according to the embodiment. Of course, in the invention it is not limited to the relationships in value of the capacity of the first capacitor $C_1$ and that of the second $C_2$. So both the said first capacitor $C_1$ voltage and the said second $C_2$ voltage are half of $U_{PV}$. The said floating capacitor $C_s$ voltage is also half of $U_{PV}$.

According to the embodiment, either the first capacitor $C_1$ or the second $C_2$ provides power for the half-bridge inverter module M2, or either the first capacitor $C_1$ or the second $C_2$ added algebraically to the floating capacitor $C_s$ provides power for the half-bridge inverter module M2. In the latter case, the input voltage of the half-bridge inverter module M2 is $U_{PV}$ which is the same with that of the full bridge inverter under the same working condition.

Therefore, the five-level inverter including the said five-level topology unit without an extra circuit to raise input voltage (i.e. Boost circuit) is able to output the same AC power as the said five-level full bridge inverter under the same working condition. As the absence of the Boost circuit, the said five-level inverter achieves low cost, high efficiency and reliability. In addition, the cost is reduced by using only one AC filtering inductor and the leakage current is eliminated substantially by using the half-bridge inverter module.

It can be used for, but not limited to, renewable energy power system, such as single-phase or three-phase grid-connected photovoltaic system.

Figure 3:
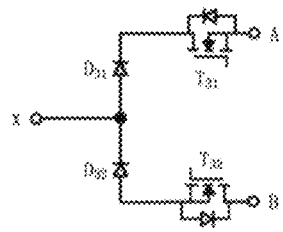
FIG. 3 is the first schematic circuit diagram of the circuit module according to an embodiment of the invention.

FIG. 3 shows the first schematic circuit diagram of the said circuit module M1 according to an embodiment of the invention. The said circuit module M1 comprises a first bidirectional switch $T_{31}$, a second bidirectional switch $T_{32}$, a first diode $D_{31}$ and a second diode $D_{32}$.

The positive terminal of the first diode $D_{31}$ is connected with the negative terminal of the second diode $D_{32}$ and the negative terminal of the first diode $D_{31}$ is connected with the first terminal of the first bidirectional switch $T_{31}$. The second terminal of the first bidirectional switch $T_{31}$ is connected with the said second terminal A of the said circuit module M1. The positive terminal of the second diode $D_{32}$ is connected with the second terminal of the second bidirectional switch $T_{32}$ whose first terminal is connected with the said third terminal B. The common terminal of the first diode $D_{31}$ and the second diode $D_{32}$ is connected with the said first terminal X.

The said first subordinate switching circuit branch in the said circuit module M1 comprises the first diode $D_{31}$ and the first bidirectional switch $T_{31}$. The said second subordinate switching circuit branch comprises the second diode $D_{32}$ and the second bidirectional switch $T_{32}$.

Figure 4:
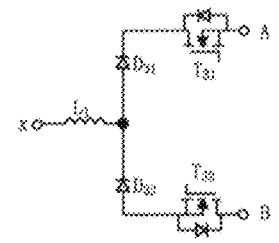
FIG. 4 is the second schematic circuit diagram of the circuit module according to an embodiment of the invention.
Figure 6:
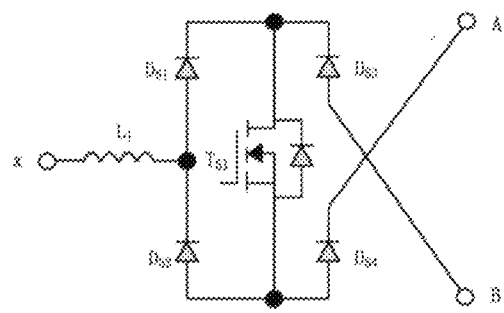
FIG. 6 is the fourth schematic circuit diagram of the circuit module according to an embodiment of the invention.
Figure 8:
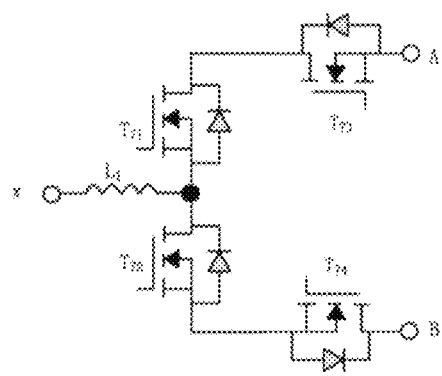
FIG. 8 is the sixth schematic circuit diagram of the circuit module according to an embodiment of the invention.
Figure 10:
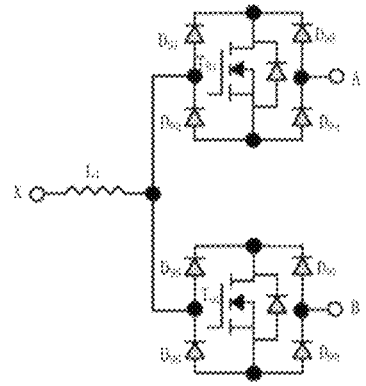
FIG. 10 is the eighth schematic circuit diagram of the circuit module according to an embodiment of the invention.

FIG. 4 is the second schematic circuit diagram of the said circuit module M1 according to an embodiment of the invention. It can be seen that in FIG. 4 there is an extra first inductor $L_1$ between the said first terminal X and the common terminal of the first diode $D_{31}$ and the second diode $D_{32}$ based on the circuit in FIG. 3. The extra first inductor $L_1$ is used to prevent impact current in the said charging loop circuit from influencing the said floating capacitor $C_s$. Similarly, the first inductor $L_1$ respectively in any one of the circuits in FIG. 6, FIG. 8 and FIG. 10 acts as the same role. For the sake of brevity, it is not described repeatedly below.

As the capacity of the said floating capacitor $C_s$ is very small, the first inductor $L_1$ with small inductance is able to meet the requirement. In practical situation, the second inductance $L_2$ is usually hundreds of times of the inductance $L_1$. To reduce in size and lower cost, the inductor $L_1$ is able to share a magnetic core with the second inductor $L_2$.

Figure 5:
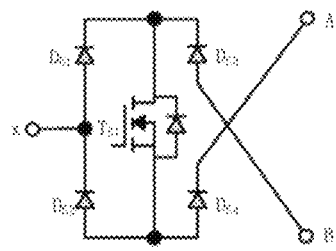
FIG. 5 is the third schematic circuit diagram of the circuit module according to an embodiment of the invention.

FIG. 5 is the third schematic circuit diagram of the said circuit module M1 according to an embodiment of the invention. The said circuit module M1 comprises a first bidirectional switch $T_{51}$, a first diode $D_{51}$, a second diode $D_{52}$, a third diode $D_{53}$, and a fourth diode $D_{54}$.

The positive terminal of the first diode $D_{51}$ is connected with the said first terminal X and its negative terminal is connected with the first terminal of the first bidirectional switch $T_{51}$. The negative terminal of the third diode $D_{53}$ is connected with the negative of the first diode $D_{51}$, and its positive terminal is connected with the said third terminal B. The negative terminal of the second diode $D_{52}$ is connected with the positive terminal of the first diode $D_{51}$, and its positive terminal is connected with the second terminal of the first bidirectional switch $T_{51}$. At the same time, the negative terminal of the fourth diode $D_{54}$ is connected with the said second terminal A, and its positive terminal is connected with the positive terminal of the second diode $D_{52}$.

The said first subordinate switching circuit branch in the said circuit module M1 comprises the first diode $D_{51}$, the fourth diode $D_{54}$ and the first bidirectional switch $T_{51}$. The said second subordinate switching circuit branch comprises the second diode $D_{52}$, the third diode $D_{53}$ and the first bidirectional switch $T_{51}$.

Figure 7:
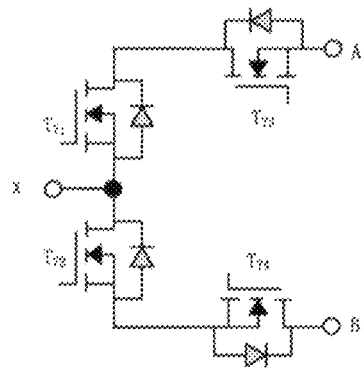
FIG. 7 is the fifth schematic circuit diagram of the circuit module according to an embodiment of the invention.

FIG. 7 is the fifth schematic circuit diagram of the said circuit module M1 according to an embodiment of the invention. The said circuit module M1 comprises a first bidirectional switch $T_{71}$, a second bidirectional switch $T_{72}$, a third bidirectional switch $T_{73}$ and a fourth bidirectional switch $T_{74}$.

The second terminal of the first bidirectional switch $T_{71}$ is connected with the first terminal of the second bidirectional switch $T_{72}$, and its first terminal is connected with the first terminal of the third bidirectional switch $T_{73}$ whose second is connected with the said second terminal A. The common terminal of the first bidirectional switch $T_{71}$ and the second bidirectional switch $T_{72}$ is connected with the said first terminal X. At the same time, the second terminal of the second bidirectional switch $T_{72}$ is connected with the second terminal of the fourth bidirectional switch $T_{74}$ whose first terminal is connected with the said third terminal B.

The said first subordinate switching circuit branch in the said circuit module M1 comprises the first bidirectional switch $T_{71}$ and the third bidirectional switch $T_{73}$. The said second subordinate switching circuit branch comprises the second bidirectional switch $T_{72}$ and the fourth bidirectional switch $T_{74}$.

Figure 9:
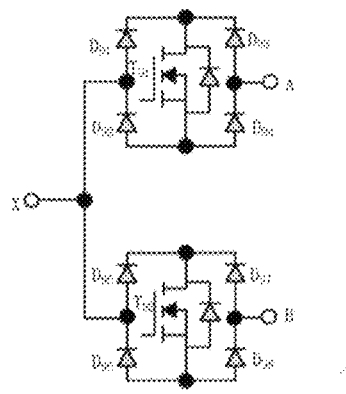
FIG. 9 is the seventh schematic circuit diagram of the circuit module according to an embodiment of the invention.

FIG. 9 is the seventh schematic circuit diagram of the said circuit module M1 according to an embodiment of the invention. The said circuit module M1 comprises a first bidirectional switch $T_{91}$, a second bidirectional switch $T_{92}$, a first diode $D_{91}$~ an eighth diode $D_{98}$.

The positive terminal of the first diode $D_{91}$ is connected with the negative terminal of the second diode $D_{92}$ and the negative of the first diode $D_{91}$ is connected with the first terminal of the first bidirectional switch $T_{91}$. The positive terminal of the second diode $D_{92}$ is connected with the second terminal of the first bidirectional switch $T_{91}$. The common terminal of the first diode $D_{91}$ and the second diode $D_{92}$ is connected with the said first terminal X.

The positive terminal of the third diode $D_{93}$ is connected with the negative terminal of the fourth diode $D_{94}$ and the negative of the third diode $D_{93}$ is connected with the first terminal of the first bidirectional switch $T_{91}$. The positive terminal of the fourth diode $D_{94}$ is connected with the second terminal of the first bidirectional switch $T_{91}$. The common terminal of the third diode $D_{93}$ and the fourth diode $D_{94}$ is connected with the said second terminal A.

The positive terminal of the fifth diode $D_{95}$ is connected with the negative terminal of the sixth diode $D_{96}$. The negative terminal of the fifth diode $D_{95}$ is connected with the first terminal of the second bidirectional switch $T_{92}$. The positive terminal of the sixth diode $D_{96}$ is connected with the second terminal of the second bidirectional switch $T_{92}$. The common terminal of the fifth diode $D_{95}$ and the sixth diode $D_{96}$ is connected with the first terminal X.

The positive terminal of the seventh diode $D_{97}$ is connected with the negative terminal of the eighth diode $D_{98}$. The negative of the seventh diode $D_{97}$ is connected with the first terminal of the second bidirectional switch $T_{92}$. The positive terminal of the eighth diode $D_{98}$ is connected with the second terminal of the second bidirectional switch $T_{92}$. The common terminal of the seventh diode $D_{97}$ and the eighth diode $D_{98}$ is connected with the third terminal B.

The said first subordinate switching circuit branch in the said circuit module M1 comprises the first bidirectional switch $T_{91}$, the first diode $D_{91}$ and the fourth diode $D_{94}$, or comprises the first bidirectional switch $T_{91}$, the second diode $D_{92}$ and the third diode $D_{93}$. The said second subordinate switching circuit branch comprises the second bidirectional switch $T_{92}$, the fifth diode $D_{95}$ and the eighth diode $D_{98}$, or comprises the second bidirectional switch $T_{92}$, the sixth diode $D_{96}$ and the seventh diode $D_{97}$.

Figure 11:
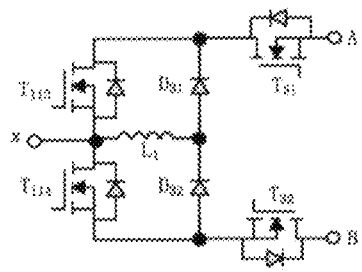
FIG. 11 is the ninth schematic circuit diagram of the circuit module according to an embodiment of the invention.

FIG. 11 is the ninth schematic circuit diagram of the said circuit module M1 according to an embodiment of the invention. The said circuit module M1 comprises an extra third bidirectional switch $T_{113}$ and a fourth bidirectional switch $T_{114}$ based on the circuit in FIG. 4.

As shown in FIG. 11, the first terminal of the third bidirectional switch $T_{113}$ is connected with the negative terminal of the first diode $D_{31}$, and the second terminal of the third bidirectional switch $T_{113}$ is connected with the first terminal of the fourth bidirectional switch $T_{114}$ whose second terminal is connected with the positive terminal of the second diode $D_{32}$. The common terminal of the third bidirectional switch $T_{113}$ and the fourth bidirectional switch $T_{114}$ is connected with the said first terminal X.

The said first subordinate switching circuit branch in the said circuit module M1 comprises the first diode $D_{31}$, the first bidirectional switch $T_{31}$ and the first inductor $L_1$. The said second subordinate switching circuit branch comprises the second bidirectional switch $T_{32}$, the second diode $D_{32}$ and the first inductor $L_1$. The third bidirectional switch $T_{113}$ and the fourth bidirectional switch $T_{114}$ are used to provide a freewheeling branch for the current in the first inductor $L_1$.

Figure 12:
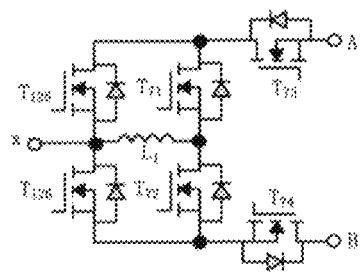
FIG. 12 is the tenth schematic circuit diagram of the circuit module according to an embodiment of the invention.

FIG. 12 is the tenth schematic circuit diagram of the said circuit module M1 according to an embodiment of the invention. The said circuit module M1 comprises an extra fifth bidirectional switch $T_{125}$ and a sixth bidirectional switch $T_{126}$ based on the circuit in FIG. 8. The fifth bidirectional switch $T_{125}$ and the sixth bidirectional switch $T_{126}$ are used to provide a freewheeling branch for the current in the first inductor $L_1$.

As shown in FIG. 12, the first terminal of the fifth bidirectional switch $T_{125}$ is connected with that of the first bidirectional switch $T_{71}$ and the second terminal is connected with the said first terminal X. The first terminal of the sixth bidirectional switch $T_{126}$ is connected with the said first terminal X and the second terminal is connected with that of the second bidirectional switch $T_{72}$.

The said first subordinate switching circuit branch of the said circuit module M1 comprises the first inductor $L_1$, the first bidirectional switch $T_{71}$ and the third bidirectional switch $T_{73}$. The said second subordinate switching circuit branch comprises the first inductor $L_1$, the second bidirectional switch $T_{72}$ and the fourth bidirectional switch $T_{74}$.

Figure 13:
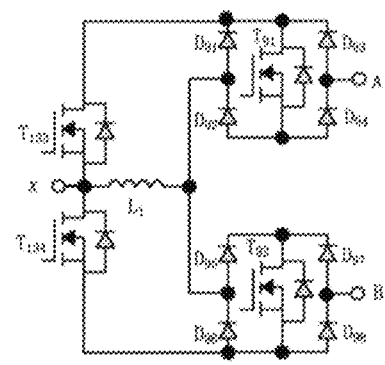
FIG. 13 is the eleventh schematic circuit diagram of the circuit module according to an embodiment of the invention.

FIG. 13 is the eleventh schematic circuit diagram of the said circuit module M1 according to an embodiment of the invention. The said circuit module M1 comprises an extra third bidirectional switch $T_{133}$ and a fourth bidirectional switch $T_{134}$ in contrast with the circuit in FIG. 10. The third bidirectional switch $T_{133}$ and the fourth bidirectional switch $T_{134}$ are used to provide a freewheeling branch for the current in the first inductor $L_1$.

The first terminal of the third bidirectional switch $T_{133}$ is connected with that of the first bidirectional switch $T_{91}$ and the second terminal is connected with the said first terminal X. The first terminal of the fourth bidirectional switch $T_{134}$ is connected with the said first terminal X and the second terminal is connected with that of the second bidirectional switch $T_{92}$.

The said first subordinate switching circuit branch of the said circuit module M1 comprises the first inductor $L_1$, the first bidirectional switch $T_{91}$, the first diode $D_{91}$ and the fourth diode $D_{94}$ or comprises the first inductor $L_1$, the first bidirectional switch $T_{91}$, the second diode $D_{92}$ and the third diode $D_{93}$. The said second subordinate switching circuit branch comprises the first inductor $L_1$, the second bidirectional switch $T_{92}$, the fifth diode $D_{95}$ and the eighth diode $D_{98}$ or comprises the first inductor $L_1$, the second bidirectional switch $T_{92}$, the sixth diode $D_{96}$ and the seventh diode $D_{97}$.

Figure 14:
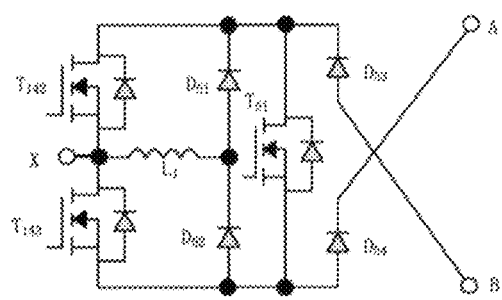
FIG. 14 is the twelfth schematic circuit diagram of the circuit module according to an embodiment of the invention.

FIG. 14 is the twelfth schematic circuit diagram of the said circuit module M1 according to an embodiment of the invention. The said circuit module M1 comprises an extra second bidirectional switch $T_{142}$ and a third bidirectional switch $T_{143}$ in contrast with the circuit in FIG. 6.

The first terminal of the second bidirectional switch $T_{142}$ is connected with that of the first bidirectional switch $T_{51}$ and the second terminal is connected with the said first terminal X. The first terminal of the third bidirectional switch $T_{143}$ is connected with the said first terminal X and the second terminal is connected with that of the first bidirectional switch $T_{51}$.

The said first subordinate switching circuit branch in the said circuit module M1 comprises the first inductor $L_1$, the first diode $D_{51}$, the fourth diode $D_{54}$ and the first bidirectional switch $T_{51}$. The said second subordinate switching circuit branch comprises the first inductor $L_1$, the second diode $D_{52}$, the third diode $D_{53}$ and the first bidirectional switch $T_{51}$. The second bidirectional switch $T_{142}$ and third bidirectional switch $T_{143}$ are used to provide a freewheeling branch for the current in the first inductor $L_1$.

Provided are three kinds of circuits for the said first subordinate module M21 in the said half-bridge inverter module M2.

Figure 15:
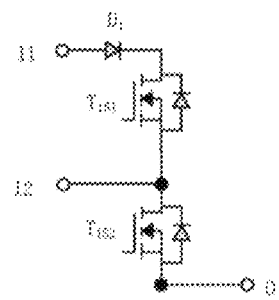
FIG. 15 is the first schematic circuit diagram of the said first subordinate module according to an embodiment of the invention.

FIG. 15 is the first schematic circuit diagram of the said first subordinate module M21 according to an embodiment of the invention. The said first subordinate module M21 comprises a first bidirectional switch $T_{151}$, a second bidirectional switch $T_{152}$ and a first diode $D_1$.

The positive terminal of the first diode $D_1$ is connected with the said first input terminal I1 of the said half-bridge inverter module M2 and the negative terminal is connected with the first terminal of the first bidirectional switch $T_{151}$ whose second terminal is connected with the first of the second bidirectional switch $T_{152}$. The common terminal of the first bidirectional switch $T_{151}$ and the second bidirectional switch $T_{152}$ is connected with the said second input terminal I2. The second terminal of the second bidirectional switch $T_{152}$ is connected with the output terminal O.

Figure 16:
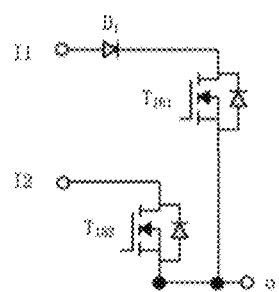
FIG. 16 is the second schematic circuit diagram of the said first subordinate module according to an embodiment of the invention.

FIG. 16 is the second schematic circuit diagram of the said first subordinate module M21 according to an embodiment of the invention. The said first subordinate module M21 comprises a first bidirectional switch $T_{161}$, a second bidirectional switch $T_{162}$ and a first diode $D_1$.

The positive terminal of the first diode $D_1$ is connected with the said first input terminal I1 and the negative terminal is connected with the first terminal of the first bidirectional switch $T_{161}$ whose second terminal is connected with the output terminal O. At the same time, the first terminal of the second bidirectional switch $T_{162}$ is connected with the said second input terminal I2 and the second terminal is connected with the output terminal O.

Figure 17:
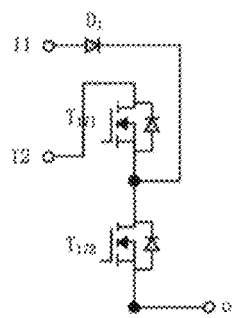
FIG. 17 is the third schematic circuit diagram of the said first subordinate module according to an embodiment of the invention.

FIG. 17 is the third schematic circuit diagram of the said first subordinate module M21 according to an embodiment of the invention. The said first subordinate module M21 comprises a first bidirectional switch $T_{171}$, a second bidirectional switch $T_{172}$ and a first diode $D_1$.

The positive terminal of the first diode $D_1$ is connected with the said first input terminal I1 and the negative terminal is connected with the first terminal of the second bidirectional switch $T_{172}$ whose second terminal is connected with the output terminal O. The first terminal of the second bidirectional switch $T_{172}$ is connected with the second of the first bidirectional switch $T_{171}$ whose first terminal is connected with the said second input terminal I2.

Provided below are three kinds of circuits for the said second subordinate module M22 in the said half-bridge inverter module M2.

Figure 18:
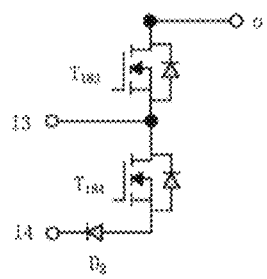
FIG. 18 is the first schematic circuit diagram of the said second subordinate module according to an embodiment of the invention.

FIG. 18 is the first schematic circuit diagram of the said second subordinate module M22 according to an embodiment of the invention. The said second subordinate module M22 comprises a third bidirectional switch $T_{183}$, a fourth bidirectional switch $T_{184}$ and a second diode $D_2$.

The first terminal of the third bidirectional switch $T_{183}$ is connected with the output terminal O and the second terminal is connected with the said third input terminal I3. The first terminal of the fourth bidirectional switch $T_{184}$ is connected with the second of the third bidirectional switch $T_{183}$ and the second terminal is connected with the positive terminal of the second diode $D_2$. The negative terminal of the second diode $D_2$ is connected with the said fourth input terminal I4.

Figure 19:
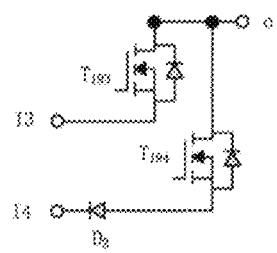
FIG. 19 is the second schematic circuit diagram of the said second subordinate module according to an embodiment of the invention.

FIG. 19 is the second schematic circuit diagram of the said second subordinate module M22 according to an embodiment of the invention. The said second subordinate module M22 comprises a third bidirectional switch $T_{193}$, a fourth bidirectional switch $T_{194}$ and a second diode $D_2$.

The first terminal of the third bidirectional switch $T_{193}$ is connected with the output terminal O and the second terminal is connected with the said third input terminal I3. The first terminal of the fourth bidirectional switch $T_{194}$ is connected with the output terminal O and the second terminal is connected with the positive terminal of the second diode $D_2$. The negative terminal of the second diode $D_2$ is connected with the said fourth input terminal I4.

Figure 20:
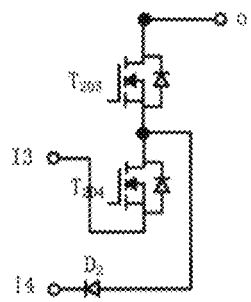
FIG. 20 is the third schematic circuit diagram of the said second subordinate module according to an embodiment of the invention.

FIG. 20 is the third schematic circuit diagram of the said second subordinate module M22 according to an embodiment of the invention. The said second subordinate module M22 comprises a third bidirectional switch $T_{203}$, a fourth bidirectional switch $T_{204}$ and a second diode $D_2$.

The first terminal of the third bidirectional switch $T_{203}$ is connected with the output terminal O and the second terminal is connected with both the first terminal of the fourth bidirectional switch $T_{204}$ and the positive terminal of the second diode $D_2$. The second terminal of the fourth bidirectional switch $T_{204}$ is connected with the said third input terminal I3. The negative terminal of the second diode $D_2$ is connected with the said fourth input terminal I4.

The said half-bridge inverter module M2 includes any one of the said three kinds of the said first subordinate module M21, and any one of the said three kinds of the said second subordinate module M22.

Figure 21:
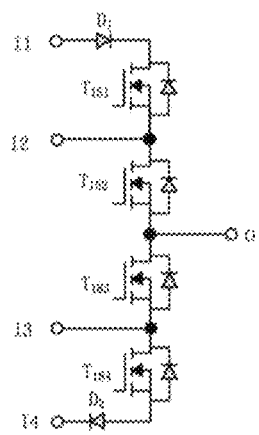
FIG. 21 is the first schematic circuit diagram of the half-bridge inverter module according to an embodiment of the invention.

For example, FIG. 21 is the first schematic circuit diagram of the said half-bridge inverter module M2 according to an embodiment of the invention. It consists of the circuits in both FIG. 15 and FIG. 18. It comprises the first diode $D_1$, the second diode $D_2$, the first bidirectional switch $T_{151}$, the second bidirectional switch $T_{152}$, the third bidirectional switch $T_{183}$ and the fourth bidirectional switch $T_{184}$.

The first switching circuit sub-branch of the said half-bridge inverter module M2 comprises the first diode $D_1$, the first bidirectional switch $T_{151}$ and the second bidirectional switch $T_{152}$. The second switching circuit sub-branch comprises the second bidirectional switch $T_{152}$. The third switching circuit sub-branch comprises the third bidirectional switch $T_{183}$. The fourth switching circuit sub-branch comprises the second diode $D_2$, the third bidirectional switch $T_{183}$ and the fourth bidirectional switch $T_{184}$.

Figure 22:
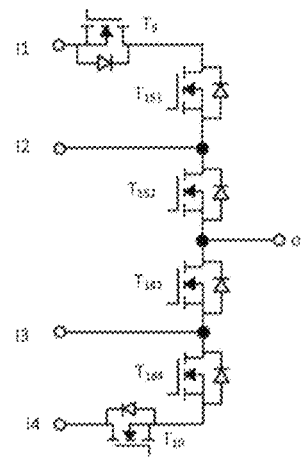
FIG. 22 is the second schematic circuit diagram of the half-bridge inverter module according to an embodiment of the invention.

FIG. 22 is the second schematic circuit diagram of the said half-bridge inverter module M2 according to an embodiment of the invention. It can be seen that a ninth bidirectional switch $T_9$ and a tenth bidirectional switch $T_{10}$ are used to replace respectively the first diode $D_1$ and the second diode $D_2$ in the circuit in FIG. 21 to make sure the current flows in both directions.

The first terminal of the ninth bidirectional switch $T_9$ is connected with the first of the first bidirectional switch $T_{151}$, and the second terminal of the ninth bidirectional switch $T_9$ is connected with the said first input terminal I1. The first terminal of the tenth bidirectional switch $T_{10}$ is connected with the said fourth input terminal I4 and the second terminal of the tenth bidirectional switch $T_{10}$ is connected with the second of the fourth bidirectional switch $T_{184}$.

Similarly, the ninth bidirectional switch $T_9$ and the tenth bidirectional switch $T_{10}$ in any one of the circuits respectively in FIG. 24, FIG. 26, FIG. 28, FIG. 30, FIG. 32, FIG. 34, FIG. 36 and FIG. 38 act as the same role. For the sake of brevity, it is not described repeatedly below.

Figure 23:
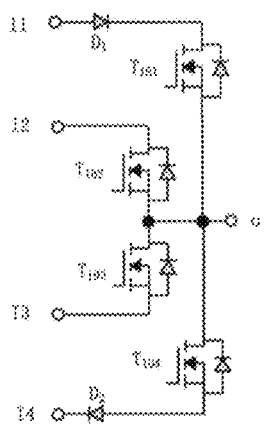
FIG. 23 is the third schematic circuit diagram of the half-bridge inverter module according to an embodiment of the invention.
Figure 24:
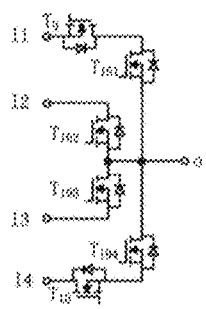
FIG. 24 is the fourth schematic circuit diagram of the half-bridge inverter module according to an embodiment of the invention.

FIG. 23 is the third schematic circuit diagram of the said half-bridge inverter module M2 according to an embodiment of the invention. It consists of the circuits in both FIG. 16 and FIG. 19. It comprises the first diode $D_1$, the second diode $D_2$, the first bidirectional switch $T_{161}$, the second bidirectional switch $T_{162}$, the third bidirectional switch $T_{193}$ and the fourth bidirectional switch $T_{194}$.

The first switching circuit sub-branch comprises the first diode $D_1$ and the first bidirectional switch $T_{161}$. The second switching circuit sub-branch comprises the second bidirectional switch $T_{162}$. The third switching circuit sub-branch comprises the third bidirectional switch $T_{193}$. The fourth switching circuit sub-branch comprises the second diode $D_2$ and the fourth bidirectional switch $T_{194}$.

Figure 25:
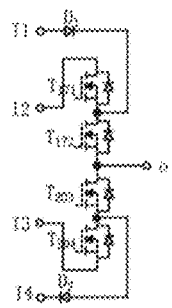
FIG. 25 is the fifth schematic circuit diagram of the half-bridge inverter module according to an embodiment of the invention.
Figure 26:
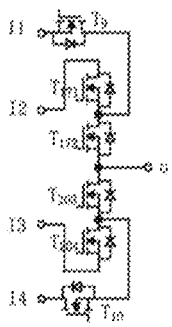
FIG. 26 is the sixth schematic circuit diagram of the half-bridge inverter module according to an embodiment of the invention.

FIG. 25 is the fifth schematic circuit diagram of the said half-bridge inverter module M2 according to an embodiment of the invention. It consists of the circuits in both FIG. 17 and FIG. 20. It comprises the first diode $D_1$, the second diode $D_2$, the first bidirectional switch $T_{171}$, the second bidirectional switch $T_{172}$, the third bidirectional switch $T_{203}$ and the fourth bidirectional switch $T_{204}$.

The first switching circuit sub-branch comprises the first diode $D_1$ and the second bidirectional switch $T_{172}$. The second switching circuit sub-branch comprises the first bidirectional switch $T_{171}$ and the second bidirectional switch $T_{172}$. The third switching circuit sub-branch comprises the third bidirectional switch $T_{203}$ and the fourth bidirectional switch $T_{204}$. The fourth switching circuit sub-branch comprises the second diode $D_2$ and the third bidirectional switch $T_{203}$.

Figure 27:
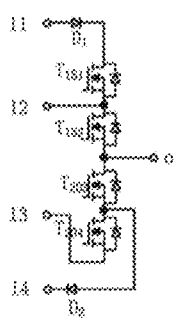
FIG. 27 is the seventh schematic circuit diagram of the half-bridge inverter module according to an embodiment of the invention.
Figure 28:
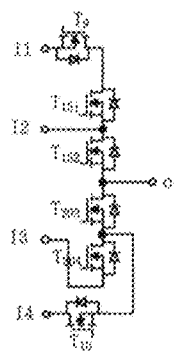
FIG. 28 is the eighth schematic circuit diagram of the half-bridge inverter module according to an embodiment of the invention.

FIG. 27 is the seventh schematic circuit diagram of the said half-bridge inverter module M2 according to an embodiment of the invention. It consists of the circuits in both FIG. 15 and FIG. 20. It comprises the first diode $D_1$, the second diode $D_2$, the first bidirectional switch $T_{151}$, the second bidirectional switch $T_{152}$, the third bidirectional switch $T_{203}$ and the fourth bidirectional switch $T_{204}$.

The first switching circuit sub-branch comprises the first diode $D_1$, the first bidirectional switch $T_{151}$ and the second bidirectional switch $T_{152}$. The second switching circuit sub-branch comprises the second bidirectional switch $T_{152}$. The third switching circuit sub-branch comprises the third bidirectional switch $T_{203}$ and the fourth bidirectional switch $T_{204}$. The fourth switching circuit sub-branch comprises the second diode $D_2$ and the third bidirectional switch $T_{203}$. It is easy to make a similar analysis to the circuits in figures at the back. For the sake of brevity, it is not described repeatedly below.

Figure 29:
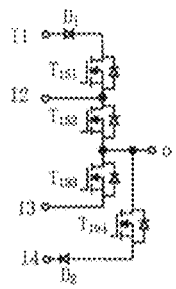
FIG. 29 is the ninth schematic circuit diagram of the half-bridge inverter module according to an embodiment of the invention.
Figure 30:
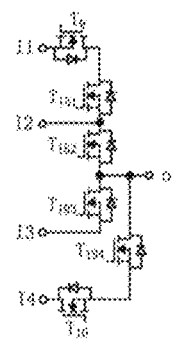
FIG. 30 is the tenth schematic circuit diagram of the half-bridge inverter module according to an embodiment of the invention.

FIG. 29 is the ninth schematic circuit diagram of the said half-bridge inverter module M2 according to an embodiment of the invention. It consists of the circuits in both FIG. 15 and FIG. 19. It comprises the first diode $D_1$, the second diode $D_2$, the first bidirectional switch $T_{151}$, the second bidirectional switch $T_{152}$, the third bidirectional switch $T_{193}$ and the fourth bidirectional switch $T_{194}$.

Figure 31:
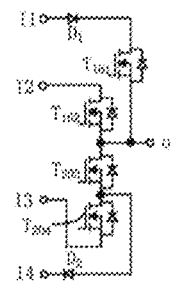
FIG. 31 is the eleventh schematic circuit diagram of the half-bridge inverter module according to an embodiment of the invention.
Figure 32:
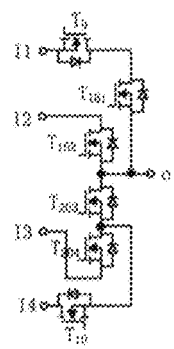
FIG. 32 is the twelfth schematic circuit diagram of the half-bridge inverter module according to an embodiment of the invention.

FIG. 31 is the eleventh schematic circuit diagram of the said half-bridge inverter module M2 according to an embodiment of the invention. It consists of the circuits in both FIG. 16 and FIG. 20. It comprises the first diode $D_1$, the second diode $D_2$, the first bidirectional switch $T_{161}$, the second bidirectional switch $T_{162}$, the third bidirectional switch $T_{203}$ and the fourth bidirectional switch $T_2$.

Figure 33:
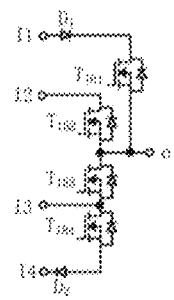
FIG. 33 is the thirteenth schematic circuit diagram of the half-bridge inverter module according to an embodiment of the invention.
Figure 34:
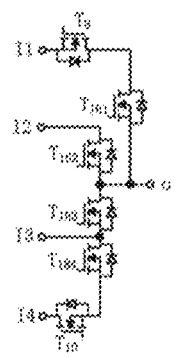
FIG. 34 is the fourteenth schematic circuit diagram of the half-bridge inverter module according to an embodiment of the invention.

FIG. 33 is the thirteenth schematic circuit diagram of the said half-bridge inverter module M2 according to an embodiment of the invention. It consists of the circuits in both FIG. 16 and FIG. 18. It comprises the first diode $D_1$, the second diode $D_2$, the first bidirectional switch $T_{161}$, the second bidirectional switch $T_{162}$, the third bidirectional switch $T_{183}$ and the fourth bidirectional switch $T_{184}$.

Figure 35:
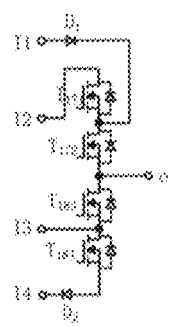
FIG. 35 is the fifteenth schematic circuit diagram of the half-bridge inverter module according to an embodiment of the invention.
Figure 36:
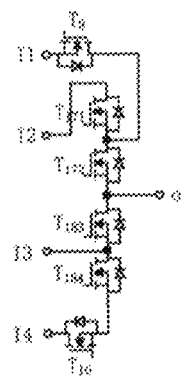
FIG. 36 is the sixteenth schematic circuit diagram of the half-bridge inverter module according to an embodiment of the invention.

FIG. 35 is the fifteenth schematic circuit diagram of the said half-bridge inverter module M2 according to an embodiment of the invention. It consists of the circuits in both FIG. 17 and FIG. 18. It comprises the first diode $D_1$, the second diode $D_2$, the first bidirectional switch $T_{171}$, the second bidirectional switch $T_{172}$, the third bidirectional switch $T_{183}$ and the fourth bidirectional switch $T_{184}$.

Figure 37:
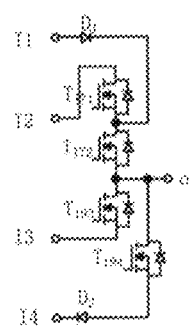
FIG. 37 is the seventeenth schematic circuit diagram of the half-bridge inverter module according to an embodiment of the invention.
Figure 38:
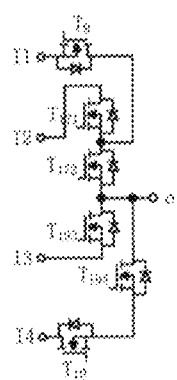
FIG. 38 is the eighteenth schematic circuit diagram of the half-bridge inverter module according to an embodiment of the invention.

FIG. 37 is the seventeenth schematic circuit diagram of the said half-bridge inverter module M2 according to an embodiment of the invention. It consists of the circuits in both FIG. 17 and FIG. 19. It comprises the first diode $D_1$, the second diode $D_2$, the first bidirectional switch $T_{171}$, the second bidirectional switch $T_{172}$, the third bidirectional switch $T_{193}$ and the fourth bidirectional switch $T_{194}$.

Figure 39:
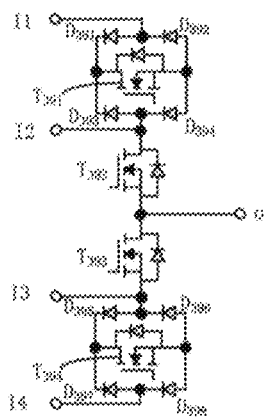
FIG. 39 is the nineteenth schematic circuit diagram of the half-bridge inverter module according to an embodiment of the invention.

FIG. 39 is the nineteenth schematic circuit diagram of the said half-bridge inverter module M2 according to an embodiment of the invention. It comprises a first diode $D_{391}$~ an eighth diode $D_{398}$ and a first bidirectional switch $T_{391}$~ fourth bidirectional switch $T_{394}$.

The positive terminal of the first diode $D_{391}$ is connected with the negative of the second diode $D_{392}$. The negative terminal of the first diode $D_{391}$ is connected with the first terminal of the first bidirectional switch $T_{391}$. The positive terminal of the second diode $D_{392}$ is connected with the second terminal of the first bidirectional switch $T_{391}$. The common terminal of the first diode $D_{391}$ and the second diode $D_{392}$ is connected with the said first input terminal I1.

The negative terminal of the third diode $D_{393}$ is connected with the first terminal of the first bidirectional switch $T_{391}$ and the positive terminal is connected with the negative of the fourth diode $D_{394}$ whose positive terminal is connected with the second terminal of the first bidirectional switch $T_{391}$. The common terminal of the third diode $D_{393}$ and fourth diode $D_{394}$ is connected with both the first terminal of the second bidirectional switch $T_{392}$ and the said second input terminal I2. The second terminal of the second bidirectional switch $T_{392}$ is connected with both the first terminal of the third bidirectional switch $T_{393}$ and the output terminal O.

The negative terminal of the fifth diode $D_{395}$ is connected with the first terminal of the fourth bidirectional switch $T_{394}$ and the positive terminal is connected with the negative of the sixth diode $D_{396}$ whose positive terminal is connected with the second terminal of the fourth bidirectional switch $T_{394}$. The common terminal of the fifth diode $D_{395}$ and the sixth diode $D_{396}$ is connected with both the second terminal of third bidirectional switch $T_{393}$ and the said third input terminal I3. The negative terminal of the seventh diode $D_{397}$ is connected with the first terminal of the fourth bidirectional switch $T_{394}$ and the positive terminal is connected with the negative of the eighth diode $D_{398}$. The positive terminal of the eighth diode $D_{398}$ is connected with the second terminal of the fourth bidirectional switch $T_{394}$. The common terminal of the seventh diode $D_{397}$ and the eighth diode $D_{398}$ is connected with the said fourth input terminal I4.

The first switching circuit sub-branch comprises the first diode $D_{391}$, the first bidirectional switch $T_{391}$, the fourth diode $D_{394}$ and the second bidirectional switch $T_{392}$ or comprises the second diode $D_{392}$, the first bidirectional switch $T_{391}$, the third diode $D_{393}$ and the second bidirectional switch $T_{392}$. The second switching circuit sub-branch comprises the second bidirectional switch $T_{392}$. The third switching circuit sub-branch comprises the third bidirectional switch $T_{393}$. The fourth switching circuit sub-branch comprises the seventh diode $D_{397}$, the fourth bidirectional switch $T_{394}$, the sixth diode $D_{396}$ and the third bidirectional switch $T_{393}$ or comprises the eighth diode $D_{398}$, the fourth bidirectional switch $T_{394}$, the fifth diode $D_{395}$ and the third bidirectional switch $T_{393}$.

Figure 40:
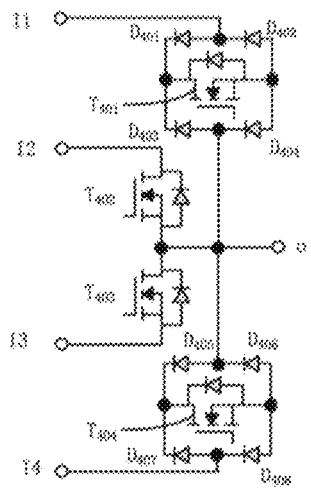
FIG. 40 is the twentieth schematic circuit diagram of the half-bridge inverter module according to an embodiment of the invention.

FIG. 40 is the twentieth schematic circuit diagram of the said half-bridge inverter module M2 according to an embodiment of the invention. It comprises a first diode $D_{401}$~ an eighth diode $D_{408}$ and a first bidirectional switch $T_{401}$~ a fourth bidirectional switch $T_{404}$.

The positive terminal of the first diode $D_{401}$ is connected with the negative of the second diode $D_{402}$. The negative terminal of the first diode $D_{401}$ is connected with the first terminal of the first bidirectional switch $T_{401}$. The positive terminal of the second diode $D_{402}$ is connected with the second terminal of the first bidirectional switch $T_{401}$. The common terminal of the first diode $D_{401}$ and the second diode $D_{402}$ is connected with the said first input terminal I1.

The negative terminal of the third diode $D_{403}$ is connected with the first terminal of the first bidirectional switch $T_{401}$ and the positive terminal is connected with the negative of the fourth diode $D_{404}$ whose positive terminal is connected with the second terminal of the first bidirectional switch $T_{401}$. The common terminal of the third diode $D_{403}$ and the fourth diode $D_{404}$ is connected with the output terminal O.

The negative terminal of the fifth diode $D_{405}$ is connected with the first terminal of the fourth bidirectional switch $T_{404}$ and the positive terminal is connected with the negative of the sixth diode $D_{406}$ whose positive terminal is connected with the second terminal of the fourth bidirectional switch $T_{404}$.

The common terminal of the fifth diode $D_{405}$ and the sixth diode $D_{406}$ is connected with the output terminal O. The negative terminal of the seventh diode $D_{407}$ is connected with the first terminal of the fourth bidirectional switch $T_{404}$ and the positive terminal is connected with the negative of the eighth diode $D_{408}$. The positive terminal of the eighth diode $D_{408}$ is connected with the second terminal of the fourth bidirectional switch $T_{404}$. The common terminal of the seventh diode $D_{407}$ and the eighth diode $D_{408}$ is connected with the said fourth input terminal I4.

The first terminal of the second bidirectional switch $T_{402}$ is connected with the said second input terminal I2. The second terminal of the second bidirectional switch $T_{402}$ is connected with both the first terminal of the third bidirectional switch $T_{403}$ and the output terminal O. The second terminal of the third bidirectional switch $T_{403}$ is connected with the said third input terminal I3.

The first switching circuit sub-branch comprises the first diode $D_{401}$, the first bidirectional switch $T_{401}$ and the fourth diode $D_{404}$, or comprises the second diode $D_{402}$, the first bidirectional switch $T_{401}$ and the third diode $D_{403}$. The second switching circuit sub-branch comprises the second bidirectional switch $T_{402}$. The third switching circuit sub-branch comprises the third bidirectional switch $T_{403}$. The fourth switching circuit sub-branch comprises the seventh diode $D_{407}$, the fourth bidirectional switch $T_{404}$ and the sixth diode $D_{406}$, or comprises the eighth diode $D_{408}$, the fourth bidirectional switch $T_{404}$ and the fifth diode $D_{405}$.

The combination of any one of the circuits in from FIG. 3 to FIG. 14 and any one of the circuits in from FIG. 21 to FIG. 40 as well as the floating capacitor $C_s$, the said first bidirectional switch $T_1$ and the said bidirectional switch $T_2$ forms a five-level topology unit according to the embodiment. It is usually used with the said first capacitor $C_1$ and the second $C_2$.

A single phase five-level inverter comprises at least a controller and the said five-level topology unit. The controller provides a control signal for each bidirectional switch in the five-level topology unit so that each one is driven by its own control signal. One terminal of AC utility is connected with the common terminal of the first DC power supply and the second DC power supply while the other terminal of AC utility is connected with the half-bridge inverter module. Take a single phase five-level inverter for example to illustrate its working modes.

Figure 41:
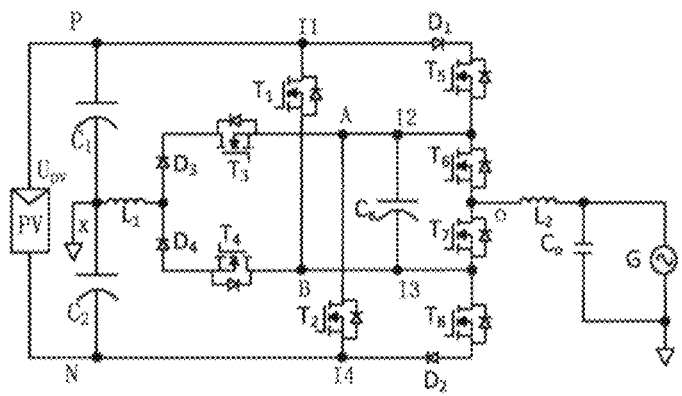
FIG. 41 is the schematic circuit diagram of a single phase five-level inverter according to an embodiment of the invention.

FIG. 41 is the schematic circuit diagram of a single phase five-level inverter according to an embodiment of the invention. It comprises a controller and a five-level topology unit including the circuits in both FIG. 4 and FIG. 21. It is used with the said first capacitor $C_1$ and the second $C_2$.

Figure 46:
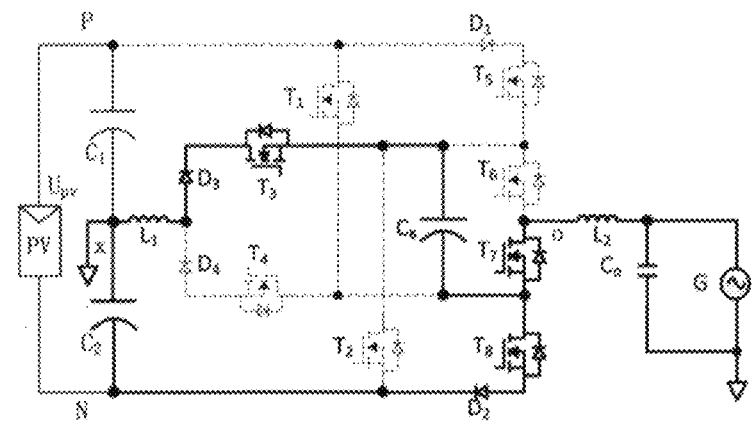
FIG. 46 is the fifth working mode diagram of a single phase five-level inverter according to an embodiment of the invention.
Figure 47:
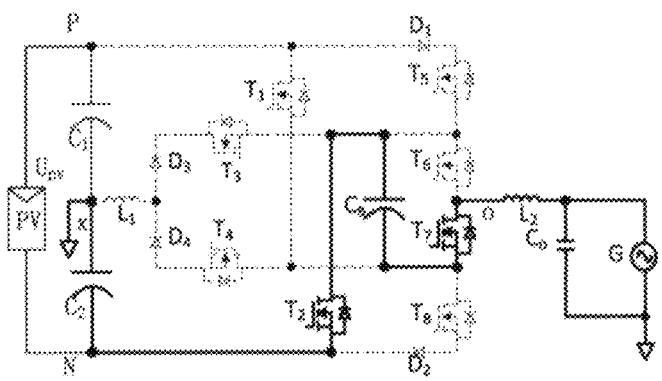
FIG. 47 is the sixth working mode diagram of a single phase five-level inverter according to an embodiment of the invention.
Figure 48:
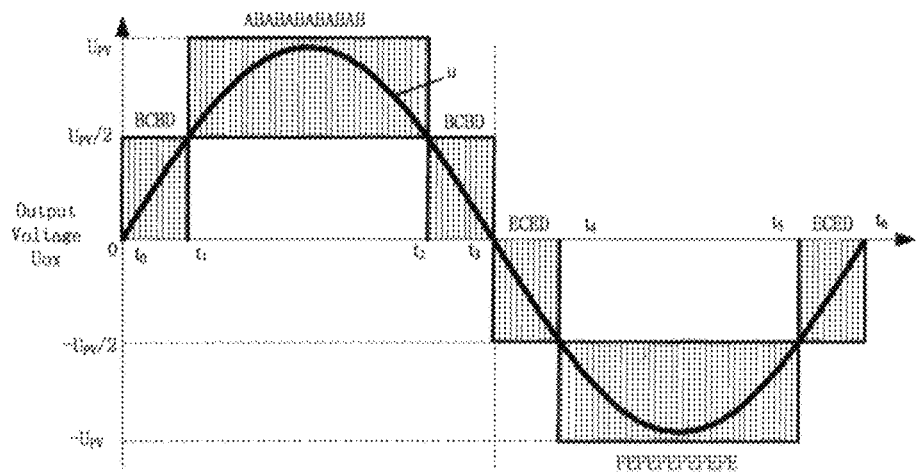
FIG. 48 is the first modulation mode diagram of a five-level inverter according to an embodiment of the invention.

Suppose the output DC voltage of photovoltaic arrays (i.e. DC power supply) is $U_{PV}$. Both the said first capacitor $C_1$ voltage and the second $C_2$ are half of $U_{PV}$ as their capacities are equal according to the embodiment. The said floating capacitor $C_s$ initial voltage is half of $U_{PV}$. The current in the filtering inductor $L_2$ flowing from left to right in circuits from FIG. 46 to FIG. 48 is defined as positive current and the opposite as negative current.

Figure 42:
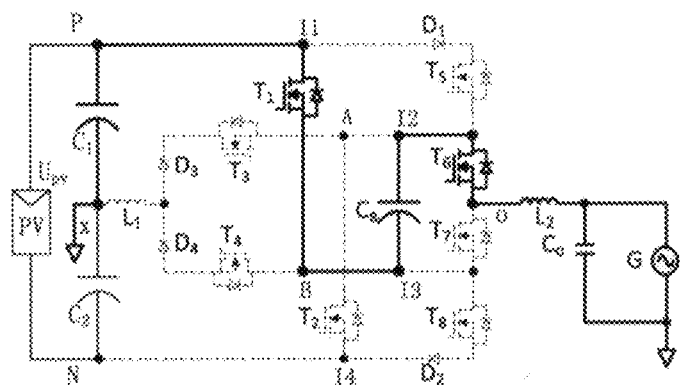
FIG. 42 is the first working mode diagram of a single phase five-level inverter according to an embodiment of the invention.

FIG. 42 is the first working mode diagram of the single phase five-level inverter according to an embodiment of the invention. As shown in FIG. 42, the positive current is as follows: $X \rightarrow C_1 \rightarrow P \rightarrow T_1 \rightarrow C_s \rightarrow T_6 \rightarrow L_2 \rightarrow G \rightarrow X$, and the negative current is: $X \rightarrow G \rightarrow L_2 \rightarrow T_6 \rightarrow C_s \rightarrow T_1 \rightarrow P \rightarrow C_1 \rightarrow X$. The output voltage $U_{OX}$ from the inverter is the sum of the said floating capacitor $C_s$ voltage and the said first capacitor $C_1$ voltage. That is, $U_{OX} = U_{PV}/2 + U_{PV}/2 = U_{PV}$.

Figure 43:
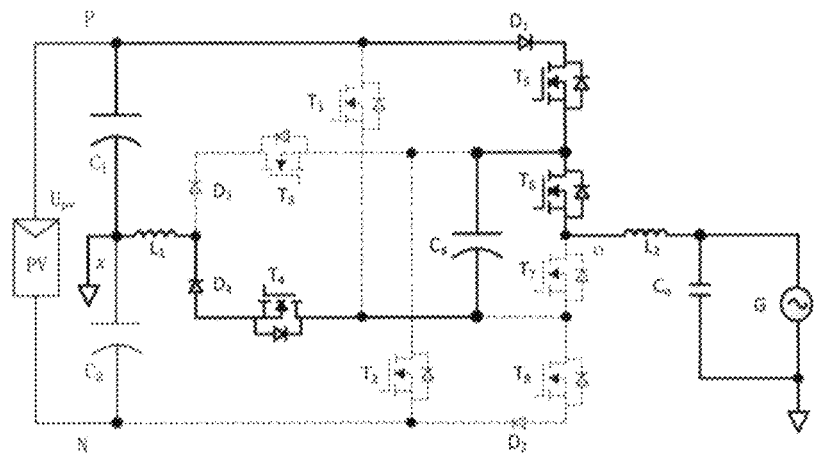
FIG. 43 is the second working mode diagram of a single phase five-level inverter according to an embodiment of the invention.

FIG. 43 is the second working mode diagram of the single phase five-level inverter according to an embodiment of the invention. As shown in FIG. 43, the positive current is as follows: $X \rightarrow C_1 \rightarrow P \rightarrow D_1 \rightarrow T_5 \rightarrow T_6 \rightarrow L_2 \rightarrow G \rightarrow X$. The output voltage $U_{OX}$ from the inverter equals the said first capacitor $C_1$ voltage. That is, $U_{OX} = U_{PV}/2$. At the same time, there is a charging loop circuit: $X \rightarrow C_1 \rightarrow P \rightarrow D_1 \rightarrow T_5 \rightarrow C_s \rightarrow T_4 \rightarrow D_4 \rightarrow L_1 \rightarrow X$. When the said floating capacitor $C_s$ voltage is less than half of $U_{PV}$, the capacitor $C_s$ is charged by the said first capacitor $C_1$ through the charging loop circuit so that its voltage is equal to that of the said first capacitor $C_1$.

To simplify the control logic and lower cost, the negative current is absent. When the diode $D_1$ above-mentioned is replaced by directional switch $T_9$, the current in the branch formed by the diode $D_1$ is able to flow in both directions.

Figure 44:
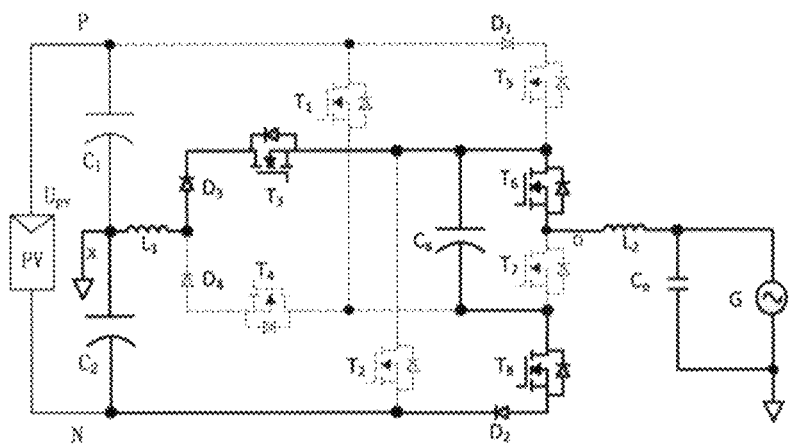
FIG. 44 is the third working mode diagram of a single phase five-level inverter according to an embodiment of the invention.

FIG. 44 is the third working mode diagram of the single phase five-level inverter according to an embodiment of the invention. As shown in FIG. 44, the positive current is as follows: $X \rightarrow L_1 \rightarrow D_3 \rightarrow T_3 \rightarrow T_6 \rightarrow L_2 \rightarrow G \rightarrow X$. It is easy to find that the output voltage $U_{OX}$ from the inverter equals zero. That is, $U_{OX} = 0$. The negative current is as follows: $X \rightarrow G \rightarrow L_2 \rightarrow T_6 \rightarrow C_s \rightarrow T_8 \rightarrow D_2 \rightarrow C_2 \rightarrow X$. As the voltage direction of the said second capacitor $C_2$ is opposite to that of the said floating capacitor $C_s$, the output voltage $U_{OX}$ from the inverter equals also zero.

When the diode $D_2$ above-mentioned is replaced by directional switch $T_{10}$, the current in the branch formed by the diode $D_2$ is able to flow in both directions.

Figure 45:
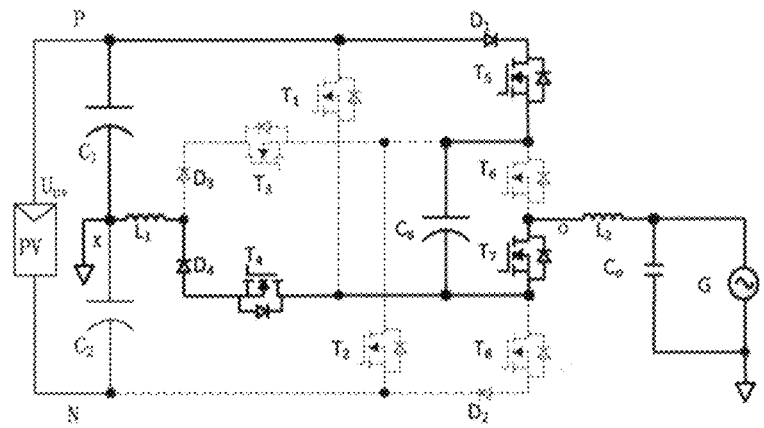
FIG. 45 is the fourth working mode diagram of a single phase five-level inverter according to an embodiment of the invention.

FIG. 45 is the fourth working mode diagram of the single phase five-level inverter according to an embodiment of the invention. As shown in FIG. 45, the positive current is as follows: $X \rightarrow C_1 \rightarrow P \rightarrow D_1 \rightarrow T_5 \rightarrow C_s \rightarrow T_7 \rightarrow L_2 \rightarrow G \rightarrow X$. The voltage direction of the said second capacitor $C_1$ is opposite to that of the said floating capacitor $C_s$, so the output voltage $U_{OX}$ from the inverter equals zero. That is, $U_{OX} = 0$. The negative current is as follows: $X \rightarrow G \rightarrow L_2 \rightarrow T_7 \rightarrow T_4 \rightarrow D_4 \rightarrow L_1 \rightarrow X$. It is easy to find that the output voltage $U_{OX}$ from the inverter equals zero.

As the current drawn from utility grid is symmetrical in its positive and negative half cycle, the positive current and negative current during a whole cycle in both the third and the fourth working modes are equal. As a result, the average voltage of the said floating capacitor $C_s$ is half of $U_{PV}$.

FIG. 46 is the fifth working mode diagram of the single phase five-level inverter according to an embodiment of the invention. As shown in FIG. 46, the negative current is as follows: $X \rightarrow G \rightarrow L_2 \rightarrow T_7 \rightarrow T_8 \rightarrow D_2 \rightarrow C_2 \rightarrow X$. The output voltage $U_{OX}$ from the inverter equals the minus voltage of the said second capacitor $C_2$. That is, $U_{OX} = -U_{PV}/2$. At the same time, there is a charging loop circuit: $X \rightarrow L_1 \rightarrow D_3 \rightarrow T_3 \rightarrow C_s \rightarrow T_7 \rightarrow L_2 \rightarrow G \rightarrow X$. When the said floating capacitor $C_s$ voltage is less than half of Up, the capacitor $C_s$ is charged by the said second capacitor $C_2$ through the charging loop circuit so that its voltage is equal to that of the said second capacitor $C_2$.

FIG. 47 is the sixth working mode diagram of the single phase five-level inverter according to an embodiment of the invention. As shown in FIG. 47, the positive current is as follows: X→$C_2$→N→$T_2$→$C_s$→$T_7$→$L_2$→G→X, and the negative current is: X→G→$L_2$→$T_7$→$C_s$→$T_2$→N→$C_2$→X. The output voltage $U_{OX}$ from the inverter is the minus sum of the said floating capacitor $C_s$ voltage and the said second capacitor $C_2$ voltage. That is, $U_{OX}=(-U_{PV}/2)+(-U_{PV}/2)=-U_{PV}$.

The single phase five-level inverter works alternately among the six working modes above-mentioned by controlling either of the on and off states of each switch to output the expected voltage. For the sake of brevity, the terms "A", "B", "C", "D", "E" and "F" as used herein are intended to respectively refer to the first, the second, the third, the fourth, the fifth and the sixth working mode of the single phase five-level inverter.

Since the output voltage $U_{OX}$ from the inverter with the positive current and negative current is zero in both the third and the fourth working modes, either of the modes works or both do alternatively in practical situation.

FIG. 48 is the first modulation mode diagram of a single phase five-level inverter according to an embodiment of the invention.

As shown in FIG. 48, it is in positive half cycle of grid power during the time period of $t_1$-$t_2$. The output voltage $U_{OX}$ from the inverter is more than half of $U_{PV}$ but less than $U_{PV}$. The inverter works alternately in the first working mode A and the second B.

It is in negative half cycle of grid power during the time period of $t_4$-$t_5$. The absolute value of output voltage $U_{OX}$ from the inverter is more than half of $U_{PV}$ but less than $U_{PV}$. The inverter works alternately in the fifth working mode E and the sixth F.

It is in positive half cycle of grid power during the time periods of $t_0$-$t_1$ and $t_2$-$t_3$. The output voltage $U_{OX}$ from the inverter is less than half of $U_{PV}$ but more than zero. The inverter works alternately among the second working mode B, the third C, the second B and the fourth D.

It is in negative half cycle of grid power during the time periods of $t_3$-$t_4$ and $t_5$-$t_6$. The absolute value of output voltage $U_{OX}$ from the inverter is more than zero but less than half of $U_{PV}$. The inverter works alternately among the fifth working mode E, the third C, the fifth E and the fourth D.

Figure 49:
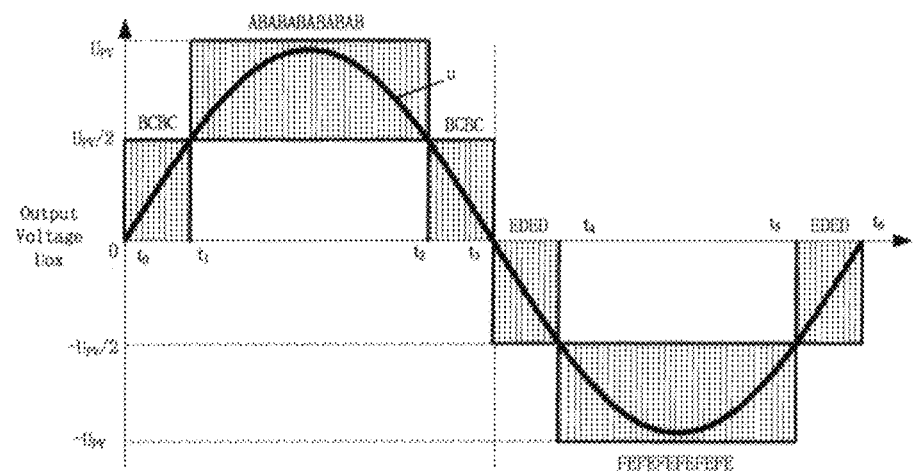
FIG. 49 is the second modulation mode diagram of a five-level inverter according to an embodiment of the invention.

FIG. 49 is the second modulation mode diagram of a single phase five-level inverter according to an embodiment of the invention.

As shown in FIG. 49, it is in positive half cycle of grid power during the time period of $t_1$-$t_2$. The output voltage $U_{OX}$ from the inverter is more than half of $U_{PV}$ but less than $U_{PV}$. The inverter works alternately in the first working mode A and the second B.

It is in negative half cycle of grid power during the time period of $t_4$-$t_5$. The absolute value of output voltage $U_{OX}$ from the inverter is more than half of $U_{PV}$ but less than $U_{PV}$. The inverter works alternately in the fifth working mode E and the sixth F.

It is in positive half cycle of grid power during the time periods of $t_0$-$t_1$ and $t_2$-$t_3$. The output voltage $U_{OX}$ from the inverter is less than half of $U_{PV}$ but more than zero. The inverter works alternately in the second working mode B and the third C.

It is in negative half cycle of grid power during the time periods of $t_3$-$t_4$ and $t_5$-$t_6$. The absolute value of output voltage $U_{OX}$ from the inverter is more than zero but less than half of $U_{PV}$. The inverter works alternately in the fifth working mode E and the fourth D.

Figure 50:
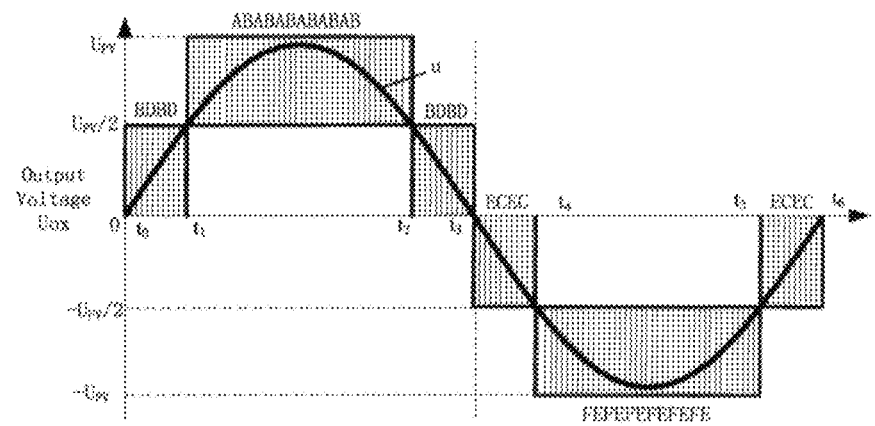
FIG. 50 is the third modulation mode diagram of a five-level inverter according to an embodiment of the invention.

FIG. 50 is the third modulation mode diagram of a single phase five-level inverter according to an embodiment of the invention.

As shown in FIG. 50, it is in positive half cycle of grid power during the time period of $t_1$-$t_2$. The output voltage $U_{OX}$ from the inverter is more than half of $U_{PV}$ but less than $U_{PV}$. The inverter works alternately in the first working mode A and the second B.

It is in negative half cycle of grid power during the time period of $t_4$-$t_5$. The absolute value of output voltage $U_{OX}$ from the inverter is more than half of $U_{PV}$ but less than $U_{PV}$. The inverter works alternately in the fifth working mode E and the sixth F.

It is in positive half cycle of grid power during the time periods of $t_0$-$t_1$ and $t_2$-$t_3$. The output voltage $U_{OX}$ from the inverter is less than half of $U_{PV}$ but more than zero. The inverter works alternately in the second working mode B and the fourth D.

It is in negative half cycle of grid power during the time periods of $t_3$-$t_4$ and $t_5$-$t_6$. The absolute value of output voltage $U_{OX}$ from the inverter is more than zero but less than half of $U_{PV}$. The inverter works alternately in the fifth working mode E and the third C.

Provided herein is a single phase five-level inverter comprising a controller and a five-level topology unit above-mentioned according to the embodiment of the invention. The output terminals of the said controller are connected respectively with the control terminal of each semiconductor switch in the said five-level topology unit so that each semiconductor switch is provided with its own control signal.

Figure 51:
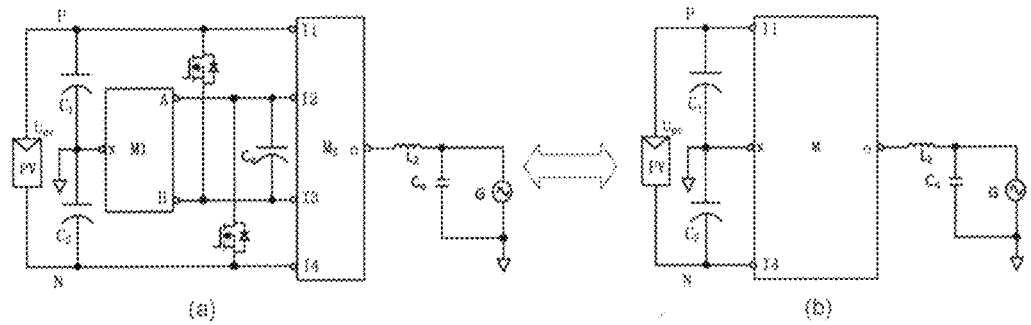
FIG. 51 is an equivalent block diagram of a single phase five-level inverter according to an embodiment of the invention.

FIG. 51 (b) is an equivalent block diagram of a five-level topology unit in FIG. 51 (a) according to an embodiment of the invention. The combination of the said circuit module M1, the said half-bridge inverter module M2, the said first switching circuit branch, the said second switching circuit branch and the said floating capacitor $C_s$ is equivalent as a five-level topology unit M in FIG. 51 (b). The said first input terminal I1 of the said half-bridge inverter module M2, the said fourth I4 and the said first terminal X of the said circuit module M1 are all used as the input terminals of the five-level topology unit M. The output terminal O of the said half-bridge inverter module M2 is used as that of the five-level topology unit M.

Figure 52:
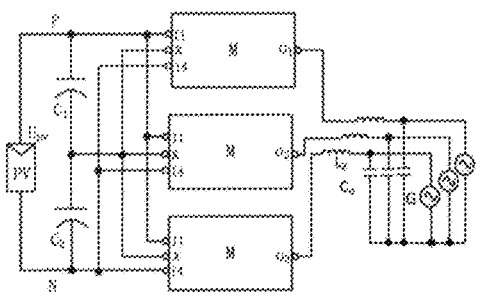
FIG. 52 is the first equivalent block diagram of a three-phase five-level inverter according to an embodiment of the invention.

FIG. 52 is the first equivalent block diagram of a three-phase five-level inverter according to an embodiment of the invention. The three-phase five-level inverter comprises a controller and three of the said five-level topology units with the common capacitor $C_1$ and capacitor $C_2$. The controller provides a control signal for each bidirectional switch in the three five-level topology units so that each bidirectional switch is driven by its own control signal. The said first input terminals I1 of the three five-level topology units M are all connected with the positive terminal of the capacitor $C_1$. Similarly, the said fourth input terminals I4 are all connected with the negative of the capacitor $C_2$ and the said first terminals X of the three five-level topology units M are connected with the common terminal of the capacitor $C_1$ and capacitor $C_2$. The three output terminals O are connected respectively with the three phase terminals of AC utility.

Figure 53:
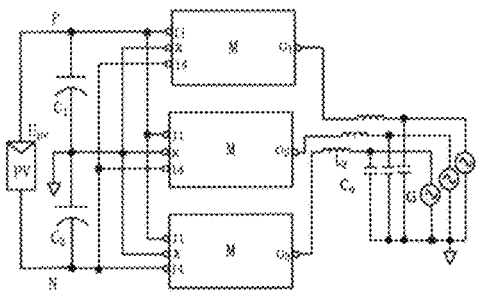
FIG. 53 is the second equivalent block diagram of a three-phase five-level inverter according to an embodiment of the invention.

FIG. 53 is the second equivalent block diagram of a three-phase five-level inverter according to an embodiment of the invention. The difference between the circuits in FIG. 52 and FIG. 53 is that the common terminal of the first DC power supply and the second DC power supply is connected with the neutral terminal of AC utility in the circuit of FIG. 53.

Figure 54:
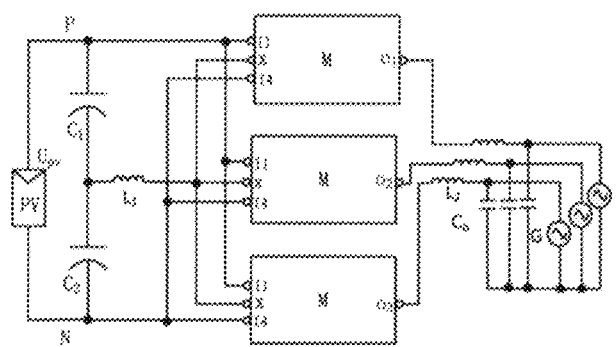
FIG. 54 is the third equivalent block diagram of a three-phase five-level inverter according to an embodiment of the invention.

FIG. 54 is the third equivalent block diagram of a three-phase five-level inverter according to an embodiment of the invention. The difference between the circuits in FIG. 52 and FIG. 54 is that all the three five-level topology units M share the first inductor in the circuit of FIG. 54.

Figure 55:
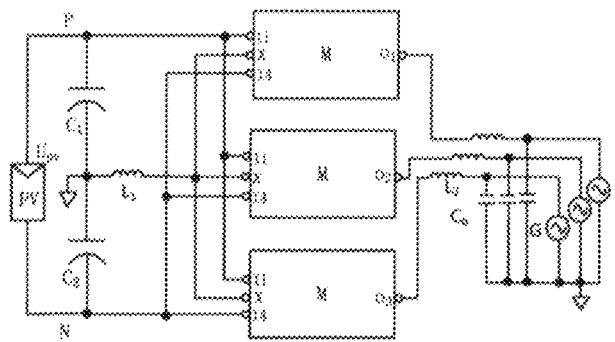
FIG. 55 is the fourth equivalent block diagram of a three-phase five-level inverter according to an embodiment of the invention.

FIG. 55 is the fourth equivalent block diagram of a three-phase five-level inverter according to an embodiment of the invention. The difference between the circuits in FIG. 55 and FIG. 54 is that the common terminal of the first DC power supply and the second DC power supply is connected with the neutral terminal of AC utility in the circuit of FIG. 55.

Each embodiment in the part of the detailed description of the embodiments goes forward one by one. The differences among the embodiments are focused on, and it is easy to understand the same or similar among all the embodiments by making a cross-reference.

Note that the relationship terms like "first", "second" and so on are used in the invention just to separate one thing or operation from the other and not to indicate any real relationship or sequence among them.

The invention claimed is:

1. A five-level topology unit for use with a first DC power supply and a second DC power supply, wherein a positive terminal of the second DC power supply is connected in series with a negative terminal of the first DC power supply at a common terminal, the five-level topology unit comprising:
   a floating capacitor that is charged by the first DC power supply or the second DC power supply;
   and
   a half-bridge inverter module, wherein the half-bridge inverter module comprises:
      a first subordinate module and a second subordinate module;
      wherein the first subordinate module comprises a first input terminal, a second input terminal, a common output terminal, a first switching circuit sub-branch and a second switching circuit sub-branch;
      wherein the second subordinate module comprises a third input terminal, a fourth input terminal, the common output terminal, a third switching circuit sub-branch and a fourth switching circuit sub-branch;
      the first input terminal is connected with a positive terminal of the first DC power supply; the second input terminal is connected with the positive terminal of the floating capacitor; the third input terminal is connected with the negative terminal of the floating capacitor; the fourth input terminal is connected with a negative terminal of the second DC power supply;
      the first switching circuit sub-branch is connected between the first input terminal and the second input terminal;
      the second switching circuit sub-branch is connected between the second input terminal and the common output terminal;
      the third switching circuit sub-branch is connected between the third input terminal and the common output terminal;
      the fourth switching circuit sub-branch is connected between the fourth input terminal and the third input terminal;
      the common output terminal is an alternating current terminal;
   the five-level topology unit further comprising a circuit module that is used to charge the floating capacitor;
      wherein the circuit module comprises a first terminal, a second terminal, a third terminal, a first subordinate switching circuit branch and a second subordinate switching circuit branch;
      the first terminal is connected with the common terminal of the first DC power supply and the second DC power supply;
      the second terminal is connected with the positive terminal of the floating capacitor; the third terminal is connected with the negative terminal of the floating capacitor;
      two terminals of the first subordinate switching circuit branch are connected respectively with the first terminal and the second terminal of the circuit module;
      two terminals of the second subordinate switching circuit branch are connected respectively with the first terminal and the third terminal of the circuit module;
   the five-level topology unit further comprising a first switching circuit branch and a second switching circuit branch;
      wherein a first terminal of the first switching circuit branch is directly connected with a positive terminal of the first DC power supply;
      a second terminal of the first switching circuit branch is directly connected with a negative terminal of the floating capacitor;
      a first terminal of the second switching circuit branch is directly connected with a positive terminal of the floating capacitor;
      a second terminal of the second switching circuit branch is directly connected with a negative terminal of the second DC power supply;
   wherein the five-level topology unit outputs five different voltage levels;
   wherein the five different voltage levels include a positive voltage of the first DC power supply, a negative voltage of the second DC power supply, the positive voltage of the first DC power supply added to a positive voltage of the floating capacitor, the negative voltage of the second DC power supply added to a negative voltage of the floating capacitor, and zero volts;
   wherein the zero volts is obtained by the positive voltage of the first DC power supply added to the negative voltage of the floating capacitor, or by the negative voltage of the second DC power supply added to the positive voltage of the floating capacitor.

2. The five-level topology unit of claim 1, wherein the first switching circuit branch comprises a first bidirectional switch and the second switching circuit branch comprises a second bidirectional switch;
   a first terminal of the first bidirectional switch is connected with the first terminal of the first switching circuit branch;
   a second terminal of the first bidirectional switch is connected with the second terminal of the first switching circuit branch;
   a first terminal of the second bidirectional switch is connected with the first terminal of the second switching circuit branch;
   a second terminal of the second bidirectional switch is connected with the second terminal of the second switching circuit branch.

3. The five-level topology unit of claim 1, wherein the circuit module comprises a first bidirectional switch, a second bidirectional switch, a first diode and a second diode;
- a positive terminal of the first diode is connected with a negative terminal of the second diode;
- a negative terminal of the first diode is connected with a first terminal of the first bidirectional switch;
- a second terminal of the first bidirectional switch is connected with the second terminal of the circuit module;
- a positive terminal of the second diode is connected with a second terminal of the second bidirectional switch;
- a first terminal of the second bidirectional switch is connected with the third terminal of the circuit module;
- a common terminal of the first diode and the second diode is connected with the first terminal of the circuit module.

4. The five-level topology unit of claim 3, wherein the circuit module further comprises a third bidirectional switch and a fourth bidirectional switch;
- a first terminal of the third bidirectional switch is connected with the negative terminal of the first diode;
- a second terminal of the third bidirectional switch is connected with a first terminal of the fourth bidirectional switch;
- a second terminal of the fourth bidirectional switch is connected with the positive terminal of the second diode;
- a common terminal of the third bidirectional switch and the fourth bidirectional switch is connected with the first terminal of the circuit module.

5. The five-level topology unit of claim 1, wherein the circuit module comprises a bidirectional switch, a first diode, a second diode, a third diode, and a fourth diode;
- a positive terminal of the first diode is connected with the first terminal of the circuit module;
- a negative terminal of the first diode is connected with a first terminal of the bidirectional switch;
- a negative terminal of the third diode is connected with a negative terminal of the first diode;
- a positive terminal of the third diode is connected with the third terminal of the circuit module;
- a negative terminal of the second diode is connected with a positive terminal of the first diode;
- a positive terminal of the second diode is connected with a second terminal of the bidirectional switch;
- a negative terminal of the fourth diode is connected with the second terminal of the circuit module;
- a positive terminal of the fourth diode is connected with a positive terminal of the second diode.

6. The five-level topology unit of claim 5, wherein the circuit module further comprises a second bidirectional switch and a third bidirectional switch;
- a first terminal of the second bidirectional switch is connected with the first terminal of the first bidirectional switch;
- a second terminal of the second bidirectional switch is connected with the first terminal of the circuit module;
- a first terminal of the third bidirectional switch is connected with the first terminal of the circuit module;
- a second terminal of the third bidirectional switch is connected with the second terminal of the first bidirectional switch.

7. The five-level topology unit of claim 1, wherein the circuit module comprises a first bidirectional switch, a second bidirectional switch, a third bidirectional switch and a fourth bidirectional switch;
- a second terminal of the first bidirectional switch is connected with a first terminal of the second bidirectional switch;
- a first terminal of the first bidirectional switch is connected with a first terminal of the third bidirectional switch;
- a second terminal of the third bidirectional switch is connected with the second terminal of the circuit module;
- a common terminal of the first bidirectional switch and the second bidirectional switch is connected with the first terminal of the circuit module;
- a second terminal of the second bidirectional switch is connected with a second terminal of the fourth bidirectional switch;
- a first terminal of the fourth bidirectional switch is connected with the third terminal of the circuit module.

8. The five-level topology unit of claim 7, wherein the circuit module further comprises a fifth bidirectional switch and a sixth bidirectional switch;
- a first terminal of the fifth bidirectional switch is connected with the first terminal of the first bidirectional switch;
- a second terminal of the fifth bidirectional switch Is connected with the first terminal of the circuit module;
- a first terminal of the sixth bidirectional switch is connected with the first terminal of the circuit module;
- a second terminal of the sixth bidirectional switch is connected with the second terminal of the second bidirectional switch.

9. The five-level topology unit of claim 1, wherein the circuit module comprises a first bidirectional switch, a second bidirectional switch, a first diode, a second diode, a third diode, a fourth diode, a fifth diode, a sixth diode, a seventh diode, and an eighth diode;
- a positive terminal of the first diode is connected with a negative terminal of the second diode;
- a negative terminal of the first diode is connected with a first terminal of the first bidirectional switch;
- a positive terminal of the second diode is connected with a second terminal of the first bidirectional switch;
- a common terminal of the first diode and the second diode is connected with the first terminal of the circuit module;
- a positive terminal of the third diode is connected with a negative terminal of the fourth diode;
- a negative terminal of the third diode is connected with the first terminal of the first bidirectional switch;
- a positive terminal of the fourth diode is connected with the second terminal of the first bidirectional switch;
- a common terminal of the third diode and the fourth diode is connected with the second terminal of the circuit module;
- a positive terminal of the fifth diode is connected with a negative terminal of the sixth diode;
- a negative terminal of the fifth diode is connected with a first terminal of the second bidirectional switch;
- a positive terminal of the sixth diode is connected with a second terminal of the second bidirectional switch;
- a common terminal of the fifth diode and the sixth diode is connected with the first terminal of the circuit module;
- a positive terminal of the seventh diode is connected with a negative terminal of the eighth diode;
- a negative terminal of the seventh diode is connected with the first terminal of the second bidirectional switch;

a positive terminal of the eighth diode is connected with the second terminal of the second bidirectional switch;

a common terminal of the seventh diode and the eighth diode is connected with the third terminal of the circuit module.

10. The five-level topology unit of claim 9, wherein the circuit module further comprises a third bidirectional switch and a fourth bidirectional switch;
   a first terminal of the third bidirectional switch is connected with the first terminal of the first bidirectional switch;
   a second terminal of the third bidirectional switch is connected with the first terminal of the circuit module;
   a first terminal of the fourth bidirectional switch is connected with the first terminal of the circuit module;
   a second terminal of the fourth bidirectional switch is connected with the second terminal of the second bidirectional switch.

11. The five-level topology unit of claim 1, wherein the circuit module further comprises a first inductor that connects the first terminal of the circuit module to the common terminal of the first DC power supply and the second DC power supply.

12. The five-level topology unit of claim 11, wherein an output of the half-bridge inverter module is connected with an AC utility through a second inductor;
   wherein the first inductor shares a magnetic core with the second inductor.

13. The five-level topology unit of claim 1, wherein the first subordinate module comprises a first bidirectional switch, a second bidirectional switch and a first diode;
   a positive terminal of the first diode is connected with the first input terminal of the first subordinate module;
   a negative terminal of the first diode is connected with a first terminal of the first bidirectional switch;
   a second terminal of the first bidirectional switch is connected with a first terminal of the second bidirectional switch;
   a common terminal of the first bidirectional switch and the second bidirectional switch is connected with the second Input terminal of the first subordinate module;
   a second terminal of the second bidirectional switch is connected with the output terminal of the first subordinate module.

14. The five-level topology unit of claim 13, wherein the first diode is replaced by a ninth bidirectional switch; or
   the second diode is replaced by a tenth bidirectional switch.

15. The five-level topology unit of claim 1, wherein the first subordinate module comprises a first bidirectional switch, a second bidirectional switch and a first diode;
   a positive terminal of the first diode is connected with the first input terminal of the first subordinate module;
   a negative terminal of the first diode is connected with a first terminal of the first bidirectional switch;
   a second terminal of the first bidirectional switch is connected with the output terminal of the first subordinate module;
   a first terminal of the second bidirectional switch is connected with the second input terminal of the first subordinate module;
   a second terminal of the second bidirectional switch is connected with the output terminal of the first subordinate module.

16. The five-level topology unit of claim 1, wherein the first subordinate module comprises a first bidirectional switch, a second bidirectional switch and a first diode;
   a positive terminal of the first diode is connected with the first input terminal of the first subordinate module;
   a negative terminal of the first diode is connected with a first terminal of the second bidirectional switch;
   a second terminal of the second bidirectional switch is connected with the output terminal of the first subordinate module;
   a first terminal of the second bidirectional switch is connected with a second of the first bidirectional switch;
   a first terminal of the first bidirectional switch is connected with the second input terminal of the first subordinate module.

17. The five-level topology unit of claim 1, wherein the second subordinate module comprises a third bidirectional switch, a fourth bidirectional switch and a second diode;
   a first terminal of the third bidirectional switch is connected with the output terminal of the second subordinate module;
   a second terminal of the third bidirectional switch is connected with the third input terminal of the second subordinate module;
   a first terminal of the fourth bidirectional switch is connected with a second terminal of the third bidirectional switch;
   a second terminal of the fourth bidirectional switch is connected with a positive terminal of the second diode;
   a negative terminal of the second diode is connected with the fourth input terminal of the second subordinate module.

18. The five-level topology unit of claim 1, wherein the second subordinate module comprises a third bidirectional switch, a fourth bidirectional switch and a second diode;
   a first terminal of the third bidirectional switch is connected with the output terminal of the second subordinate module;
   a second terminal of the third bidirectional switch is connected with the third input terminal of the second subordinate module;
   a first terminal of the fourth bidirectional switch is connected with the output terminal of the second subordinate module;
   a second terminal of the fourth bidirectional switch is connected with a positive terminal of the second diode;
   a negative terminal of the second diode is connected with the fourth input terminal of the second subordinate module.

19. The five-level topology unit of claim 1, wherein the second subordinate module comprises a third bidirectional switch, a fourth bidirectional switch and a second diode;
   a first terminal of the third bidirectional switch is connected with the output terminal of the second subordinate module;
   a second terminal of the third bidirectional switch is connected with both a first terminal of the fourth bidirectional switch and a positive terminal of the second diode;
   a second terminal of the fourth bidirectional switch is connected with the third input terminal of the second subordinate module;
   a negative terminal of the second diode is connected with the fourth input terminal of the second subordinate module.

20. A single phase five-level inverter, comprising:
   the five-level topology unit of claim 1; and a controller that provides control signals for bidirectional switches in the five-level topology unit so that each bidirectional switch is driven by its own control signal.

21. The single phase five-level inverter of claim 20, wherein a first terminal of an AC utility is connected with the common terminal of the first DC power supply and the second DC power supply and a second terminal of the AC utility is connected with an output terminal of the inverter.

22. A three-phase five-level inverter, comprising:

three five-level topology units of claim 1;

a first DC power supply and a second DC power supply, wherein a positive terminal of the second DC power supply is connected in series with a negative terminal of the first DC power supply at a common terminal; and a controller that provides control signals for bidirectional switches in the three five-level topology units so that each bidirectional switch is driven by its own control signal;

wherein all the first input terminals of the first subordinate modules in the three five-level topology units are connected with the positive terminal of the first DC power supply;

all the first terminals of the circuit modules in the three five-level topology units are connected with the common terminal of the first DC power supply and the second DC power supply;

all the fourth input terminals of the second subordinate modules in the three five-level topology units are connected with the negative terminal of the second DC power supply;

wherein first, second, and third common output terminals of the half-bridge inverter modules in the three five-level topology units are connected respectively with first, second, and third phase terminals of a three phase AC utility.

23. The three-phase five-level inverter of claim 22, wherein the common terminal of the first DC power supply and the second DC power supply is connected with g neutral terminal of AC utility.

24. The three-phase five-level inverter of claim 22, comprising:

a first inductor that connects all the first terminals of the circuit modules in the three five-level topology units to the common terminal of the first DC power supply and the second-DC power supply; and first, second, and third output inductors that connect the first, second, and third common output terminals of the half-bridge inverter modules in the three five-level topology units respectively with the first, second, and third phase terminals of the three phase AC utility.

25. The three-phase five-level inverter of claim 24, wherein the common terminal of the first DC power supply and the second DC power supply is connected with a neutral terminal of the three phase AC utility.

* * * * *